United States Patent [19]

Narita et al.

[11] Patent Number: 4,769,774
[45] Date of Patent: Sep. 6, 1988

[54] SYSTEM FOR CONTROLLING ENGINE SPEED WHEN DIRECTION OF VEHICLE CHANGED

[75] Inventors: Toshihide Narita, Obu; Masatoshi Yamada, Nagoya; Eiichi Yasuda, Seto; Yoshiyasu Uchida, Obu, all of Japan

[73] Assignees: Kabushiki Kaisha Toyoda Jidoshokki; Kabushiki Kaisha Toyota Chuo Kenkyusho Seisakusho, both of Aichi, Japan

[21] Appl. No.: 758,541

[22] Filed: Jul. 24, 1985

[30] Foreign Application Priority Data

| Jul. 26, 1984 | [JP] | Japan | 59-156327 |
| Jul. 26, 1984 | [JP] | Japan | 59-156324 |
| Jul. 26, 1984 | [JP] | Japan | 59-156325 |
| Jul. 26, 1984 | [JP] | Japan | 59-156326 |
| Aug. 2, 1984 | [JP] | Japan | 59-163034 |
| Aug. 2, 1984 | [JP] | Japan | 59-163035 |

[51] Int. Cl.$^4$ .................... B60K 41/12; G05G 5/04
[52] U.S. Cl. .................... 364/424.1; 74/866; 123/480
[58] Field of Search ............ 364/424.1; 74/866, 867, 74/877; 123/480; 474/12, 17, 18, 71

[56] References Cited

U.S. PATENT DOCUMENTS

| 4,458,318 | 7/1984 | Smit et al. | 364/424.1 |
| 4,470,117 | 9/1984 | Miki et al. | 74/866 |
| 4,561,327 | 12/1985 | Niwa et al. | 364/424.1 |
| 4,598,374 | 7/1986 | Klatt | 364/424.1 |
| 4,610,183 | 9/1986 | Nobumoto et al. | 74/866 |
| 4,627,311 | 12/1986 | Yokooku et al. | 364/424.1 |
| 4,665,772 | 5/1987 | Greene | 74/866 |

Primary Examiner—Parshotam S. Lall
Attorney, Agent, or Firm—Burgess, Ryan and Wayne

[57] ABSTRACT

A system for controlling engine speed for a vehicle such as a fork-lift. The system has an accelerator pedal for controlling an engine speed, and a control lever for controlling the direction of movement of the vehicle, or the system is provided with a seesaw type accelerator pedal for controlling the engine speed and the direction of movement of the vehicle.

An EXNOR gate is provided for detecting deceleration of the engine while the accelerator pedal is depressed. When deceleration is detected, the throttle valve is returned to an engine idling position or the supply of fuel is cut. Thus, an effective engine braking can be obtained when the direction of movement of the vehicle is changed while the accelerator pedal is depressed.

A window comparator is provided for detecting the area near the end of deceleration, so that the engine speed is increased prior to the commencement of acceleration.

35 Claims, 41 Drawing Sheets

Fig. IB
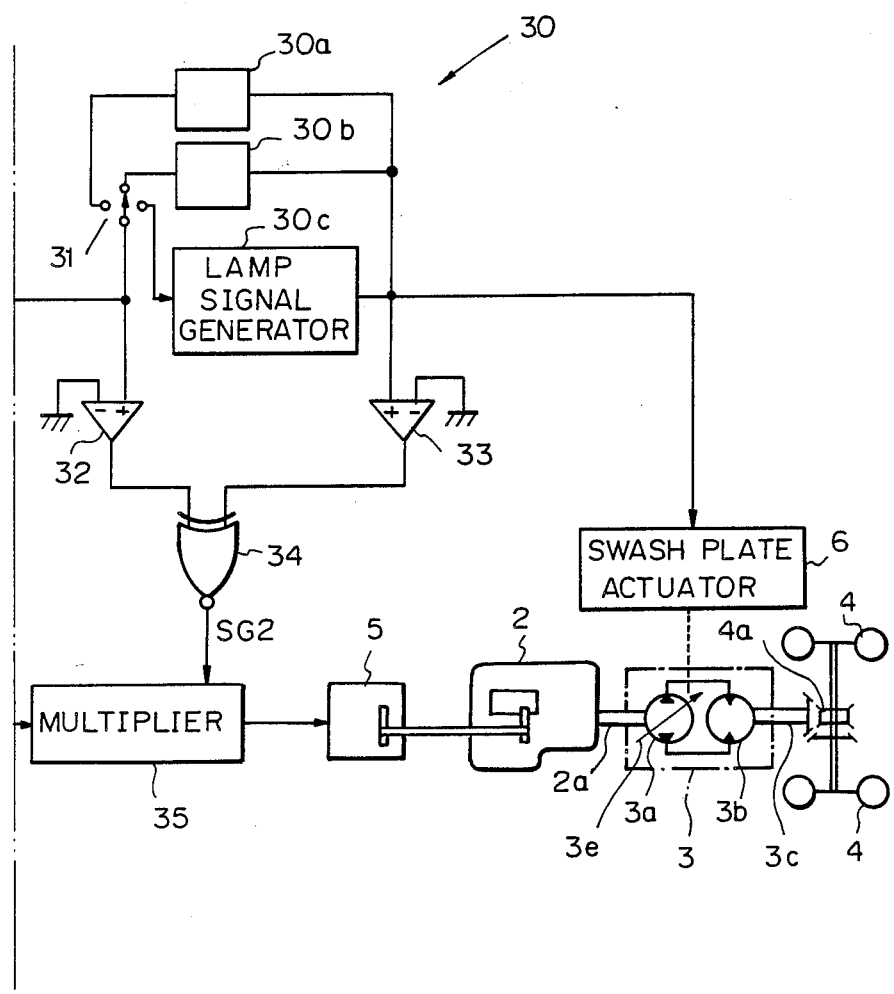

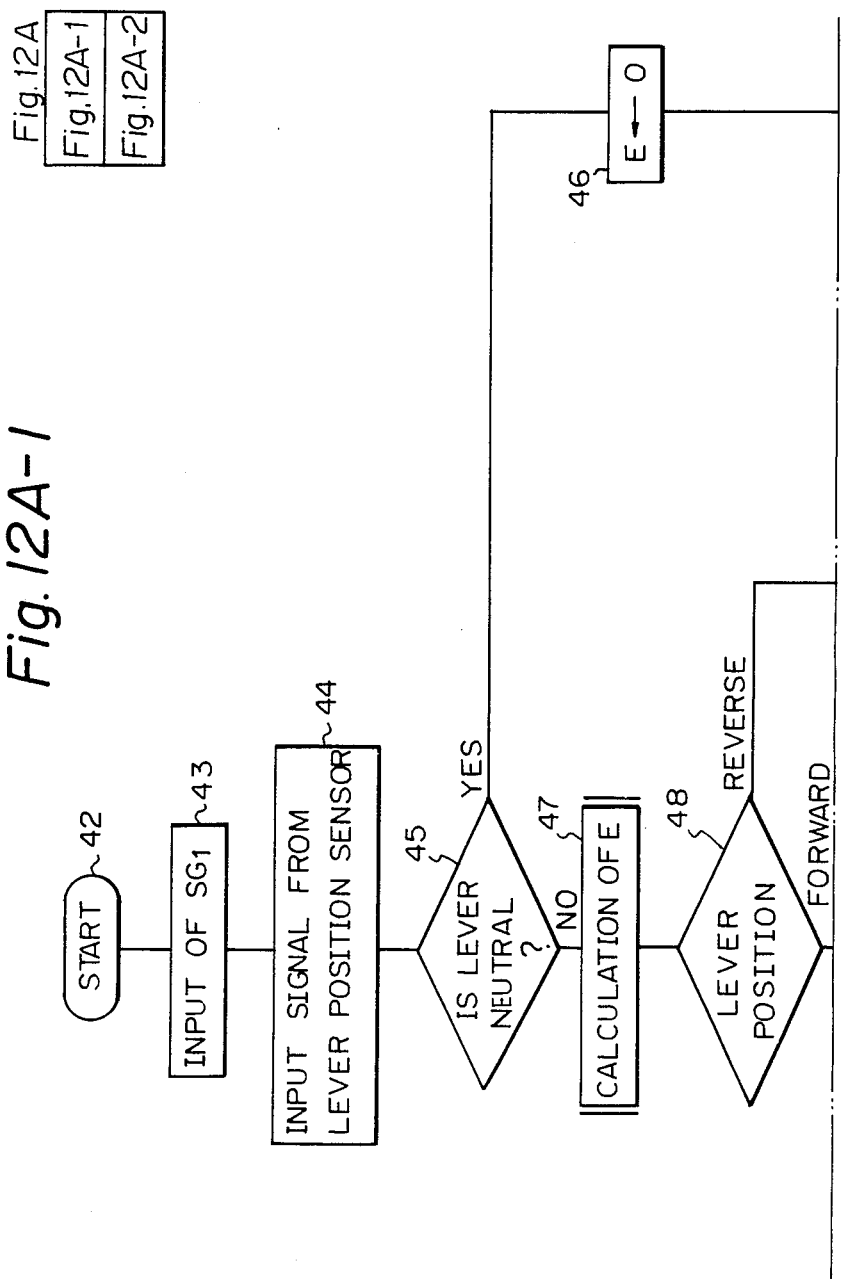

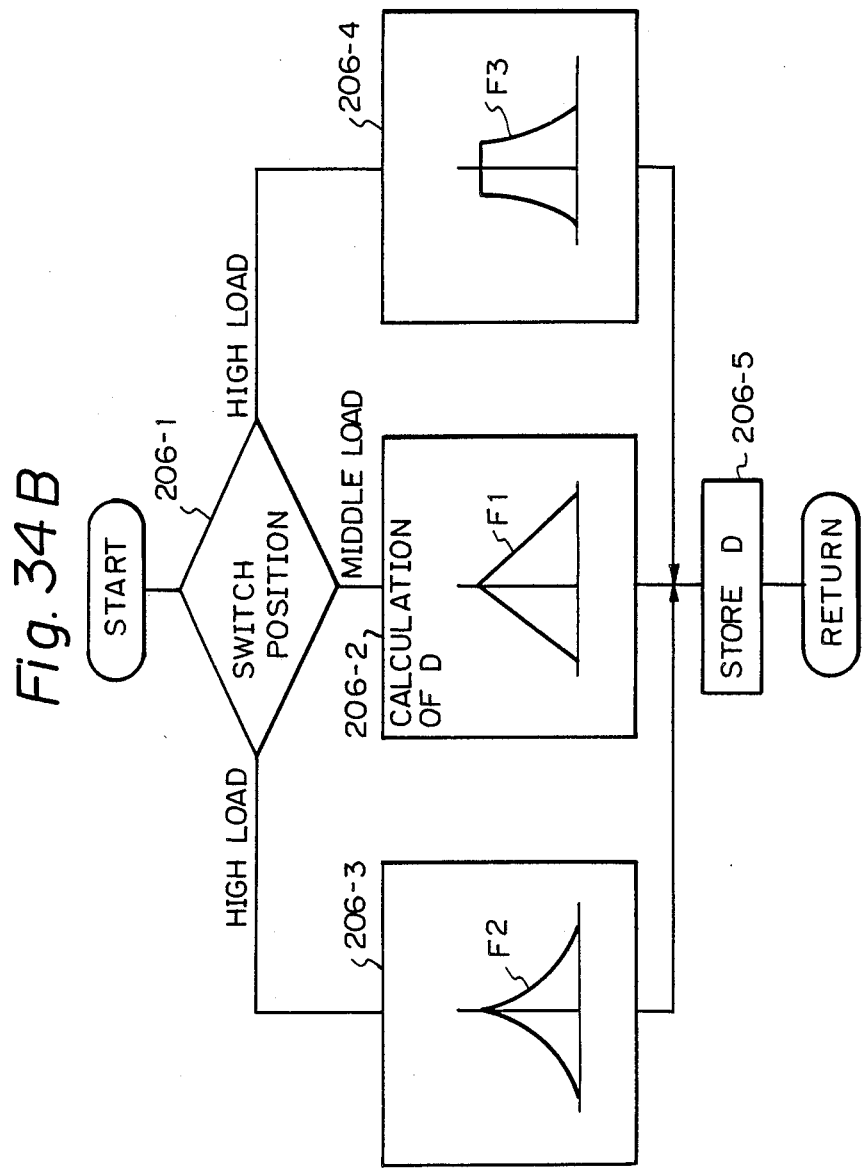

SYSTEM FOR CONTROLLING ENGINE SPEED WHEN DIRECTION OF VEHICLE CHANGED

BACKGROUND OF THE INVENTION

1. Field of the Invention

The present invention relates to a system for controlling engine speed when a vehicle changes the direction of movement.

2. Description of the Related Art

In a vehicle such as a fork-lift, an internal combustion engine is connected to a driven wheel assembly via a step-less transmission gear. The speed of the engine is controlled by a manipulator such as an accelerator pedal, and the transmission ratio in the step-less transmission gear is continuously controlled in accordance with the degree of operation of the manipulator. The fork-lift is further provided with a control lever for changing the direction of movement between the forward and reverse directions. In a conventional system, the engine speed and the direction of movement are controlled independently. Thus, when the direction of the movement is changed and the same degree of accelerator pedal depression is maintained, the transmission ratio will not be changed because the same engine speed is maintained. Thus, the engine speed is abruptly increased (i.e., racing occurs) even though the vehicle speed has become slower, which is unsettling for the operator, increases engine noise, and decreases the fuel consumption efficiency. Furthermore, at that time, engine braking can not be fully utilized, causing the vehicle stopping-distance to be increased.

SUMMARY OF THE INVENTION

According to the present invention, a system is provided for controlling engine speed when direction of vehicle movement is changed, comprising: an internal combustion engine; step-less transmission means for connecting the engine with the vehicle; first actuator means for controlling an engine operating parameter related to the engine speed; second actuator means for controlling said step-less transmission means in such a manner that the transmission ratio is continuously changed between a value lower than zero and a value higher than zero; transmission ratio control means for operating a transmission ratio control signal based on a transmission ratio signal in response to the amount of depression of the accerator pedal, when the driving direction is changed from forward to reverse or from reverse to forward and supplying said transmission ratio control signal to said second actuator means, judging means for judging the driving direction exchanged and the deceleration condition of the vehicle and supplying control signal, and engine revolution reducing means for adjusting the engine revolution to lower revolution by said control signal from said judging means.

According to this construction, the transmission ratio control means detect the point where switching occur between the forward and reverse movement, and control the transmission device under the transmission ratio of that instant. The judging means detect the direction of the movement of the vehicle and the deceleration condition, so that the engine revolution is reduced. Thus, degree of acceleration, just after the switching, is decreased, preventing the engine from being easily raced, to attain an effective engine braking. Furthermore, the engine is prevented from being accidentally raced and does not cause the operator to feel uneasy. Furthermore, the noise is decreased and the fuel consumption efficiency is increased.

According to one aspect of the invention a system is provided, for controlling engine speed when direction of vehicle changed, comprising: an internal combustion engine driving a vehicle by a step-less transmission means, controlled its rotation speed in response to a running operation system, step-less transmission means changed its transmission ratio in response to the operation amount of running operation system and having its transmission ratio varied from forward value to reverse value or in the opposite direction in response to the manipulation of a forward and reverse manipulation apparatus, control means for controlling the movement of changing transmission ratio data values when the transmission ratio data values is varied from forward value to reverse value or the opposite direction in response to the manipulation of said forward and reverse manipulation apparatus, first adjusting means for adjusting the transmission ratio in response to said transmission ratio data values, judging means for detecting transmission ratio data caused by deceleration at the switching of forward and reverse movement in response to the transmission ratio data issued from the manipulation of said forward and reverse manipulation apparatus and said second control means, and engine idling control means for, when said second detecting means detects the transmission ratio data caused by the deceleration, controlling said engine at the idling condition.

When the values of transmission ratio data based on the operation amount of the running operation system is changed from a value corresponding the forward movement to the reverse movement or from the value for reverse movement to a value for forward movement, due to the fact that the forward and reverse manipulating apparatus is switched between the forward movement to the reverse movement or from the reverse movement to the forward movement, the control means control the way of change of the transmission ratio data being changed.

The judging means judge that the transmission ratio data value is a data for deceleration upon the switching between the forward and reverse movement, based on the switching operation of the running operation system and the transmission ratio data value issued via the control means. When the result of the judgement is the transmission ratio data for deceleration, the engine idling control means control the engine so that it is brought to idling condition.

According to the second aspect of the present invention a system is provided for controlling engine speed when direction of vehicle changed, comprising: an internal combustion engine driving a vehicle by a step-less transmission means, controlled its rotation speed in response to a running operation system, step-less transmission means changed its transmission ratio in response to the operation amount of running operation system and having its transmission ratio varied from forward value to reverse value or in the opposite direction in response to the manipulation of a forward and reverse manipulation apparatus, control means for controlling the movement of changing transmission ratio data values when the transmission ratio data values is varied from forward value to reverse value or the opposite direction in response to the manipulation of said forward and reverse manipulation apparatus, manipulator means for adjusting the transmission ratio in response to said transmission ratio data values, judging means for detecting transmission ratio data caused by deceleration at the switching of forward and reverse movement in response to the transmission ratio data issued from the manipulation of said forward and reverse manipulation apparatus and said second control means, and fuel cut means for preventing fuel from being supplied to the engine when said second detecting means detects the transmission ratio data caused by the deceleration.

The operation of the invention of this aspect is substantially the same as the invention of the first aspect except for the fuel cut means. When the result of the judgement of the data by the judging means is for the data of transmission ratio for deceleration, the fuel cut means cut supply of fuel.

According to the third aspect of the invention, a system is provided for controlling engine speed when direction of vehicle changed, comprising: an internal combustion engine driving a vehicle by a step-less transmission means, controlling its rotation speed in response to a running operation system, step-less transmission means changing its transmission ratio in response to the operation amount of running operation system and having its transmission ratio varied from forward value to reverse value or in the opposite directed in response to the manipulation of a forward and reverse manipulation apparatus, first detecting means for detecting the manipulation direction of said forward and reverse manipulation apparatus, second detecting means for detecting the forward running or reverse running of the vehicle, judging means for detecting the deceleration condition at the switching of forward and reverse movement in response to the manipulation of said forward and reverse manipulation apparatus and the detected result of said second detecting means, and engine idling control means for, when said second detecting means detects the transmission ratio data caused by the deceleration, controlling said engine at the idling condition.

The value of the transmission ratio data issued in accordance with the manipulation amount of the running operation system is changed from a value for a forward movement to a value for a reverse movement or a value for a reverse movement to a value for forward movement by the fact that the forward and reverse manipulation apparatus is changed from forward movement to the reverse movement or from the reverse movement to a forward movement.

The judging means judge whether the deceleration is caused by the change of the vehicle movement between the forward and rearward movement based on the switching between the forward and reverse movement by the forward and reverse manipulation apparatus and on the result of the judgement by the second detecting means detecting whether the vehicle moves forwardly or rearwardly.

When the result of the judgement is that the deceleration is caused by switching between the forward and reverse movements, the control means control the engine so that it is brought to an idling condition.

According to the fourth aspect of the invention, a system is provided for controlling engine speed when direction of vehicle changed, comprising: an internal combustion engine driving a vehicle by a step-less transmission means, controlling its rotation speed in response to a running operation system, step-less transmission means changing its transmission ratio in response to the operation amount of running operation system and having its transmission ratio varied from forward value to reverse value or in the opposite direction in response to the manipulation of a forward and reverse manipulation apparatus, first detecting means for detecting the manipulation direction of said forward and reverse manipulation apparatus, second detecting means for detecting the forward running or reverse running of the vehicle, judging means for detecting the deceleration condition at the switching of forward and reverse movement in response to the manipulation of said forward and reverse manipulation apparatus and the detected result of said fourth detecting means, and fuel cut means for preventing fuel from being supplied to the engine when said second detecting means detects the deceleration condition at the switching of forward and reverse movement.

The operation of this invention is substantially the same as the operation of the third aspect except for the fuel cut means. When the result of the judgement is the deceleration upon the switching between the forward and the reverse movement, the fuel cut means cut the supply of fuel to be directed to the engine.

According to the fifth aspect of the invention, a system is provided for controlling engine speed when direction of vehicle changed, comprising: an internal combustion engine driving a vehicle by a step-less transmission means, controlling its rotation speed in response to a running operation system, step-less transmission means changing its transmission ratio in response to the operation amount of running operation system and having its transmission ratio varied from forward value to reverse value or in the opposite direction in response to the manipulation of a forward and reverse manipulation apparatus, control means for controlling the movement of changing transmission ratio data values when the transmission ratio data values is varied from forward value to reverse value or the opposite direction in response to the manipulation of said forward and reverse manipulation apparatus, manipulator means for adjusting the transmission ratio in response to said transmission ratio data values, judging means for detecting transmission ratio data caused by deceleration at the switching of forward and reverse movement in response to the transmission ratio data issued from the manipulation of said forward and reverse manipulation apparatus and said second control means, and adjusting means for variably adjusting the rotation speed of said engine in response to the transmission ratio data caused by the deceleration when said second detecting means detects transmission ratio data caused by deceleration.

The control means control the way of the change in the transmission ratio data value, and control the transmission ratio of the transmission means.

The judging means judge whether the transmission ratio data is for a data for deceleration upon the switching between the forward and reverse movement. When it is judged that the data is for the deceleration, the adjusting means control the engine rotational speed so that it is varied in accordance with the transmission ratio data.

According to the sixth aspect of the invention, the system is provided for controlling engine speed when direction of vehicle changed, comprising: an internal combustion engine driving a vehicle by a step-less transmission means, controlling its rotation speed in response to a running operation system, step-less transmission means changing its transmission ratio in response to the operation amount of running operation system and having its transmission ratio varied from forward value to reverse value or in the opposite direction in response to the manipulation of a forward and reverse manipulation apparatus, first adjusting means for adjusting the transmission ratio of said step-less transmission means in response to the transmission data values when the transmission ratio data values is varied from forward value to reverse value or the opposite direction in response to the manipulation of said forward and reverse manipulation apparatus, first detecting means for detecting the forward running or reverse running of the vehicle, second detecting means for detecting transmission ratio data caused by deceleration at the switching of forward and reverse movement in response to the transmission ratio data issued from the manipulation of said forward and reverse manipulation apparatus and said second control means, and second means for variably adjusting the rotation speed of said engine in response to the transmission ratio data caused by the deceleration when said second detecting means detects transmission ratio data caused by deceleration.

When the transmission ratio data is for the data for deceleration, the second adjusting means control the engine speed variably in accordance with vehicle running speed.

BRIEF DESCRIPTION OF THE DRAWINGS

The present invention will be more clearly understood from the description set forth below with reference to the accompanying drawings, wherein:

FIGS. 1A and 1B constitute a diagram of a first embodiment of the present invention;

FIGS. 12A1 and 12A2 constitute a flow chart showing the operation of the embodiment shown in FIG. 11;

FIG. 34B shows a flow chart for explaining the operation of the embodiment shown in FIG. 33;

DESCRIPTION OF THE PREFERRED EMBODIMENTS

Figure 1A:
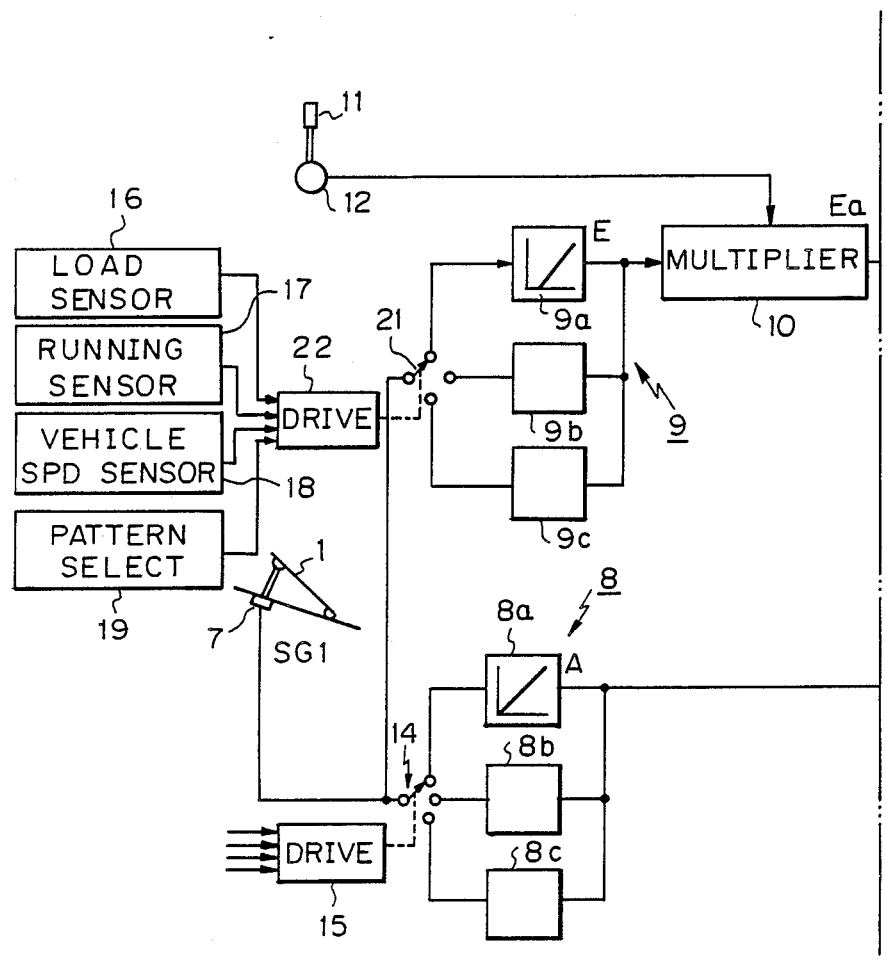

The embodiment in FIG. 1 is directed to an application for a fork-lift. The fork-lift is provided with a wheel assembly 4 driven by a drive system according to the present invention. The system has an internal combustion engine 2, which in this particular embodiment is a gasoline engine. The internal combustion engine 2 has an output shaft 2a connected to the wheel assembly 4 by way of a step-less transmission 3. The engine 2 is provided with a throttle valve 2c (FIG. 3A) which is connected to a throttle actuator 5 for controlling the opening of the throttle valve 2c (FIG. 3A) in response to the depression of an accelerator pedal 1.

The step-less transmission 3 has a positive displacement type pump 3a and hydraulic motor 3b, which are in hydraulic connection with each other in such a manner that the oil from the pump 3a driven by the shaft 2a of the engine 2 is received by the motor 3b, causing the motor 3b to rotate and thus rotate the output shaft 3c. The output shaft 3c is connected to the drive wheel assembly 4 via a differential device 4a. The positive displacement pump 3a is provided with a swash plate 3e, which is inclined to control the amount of oil supplied to the motor 3b and to control the direction of the flow of oil. As a result, in accordance with the degree of inclination of the swash plate 3e, the transmission ratio, which is the ratio of the rotational speed of the shaft 3c to the rotational speed of the shaft 2a, is continuously varied. In addition, the motor 3b is forwardly or reversely rotated for moving the vehicle forward or in reverse. An actuator 6 is connected to the swash plate 3e for controlling the inclination of the plate 3e.

Figure 2A:
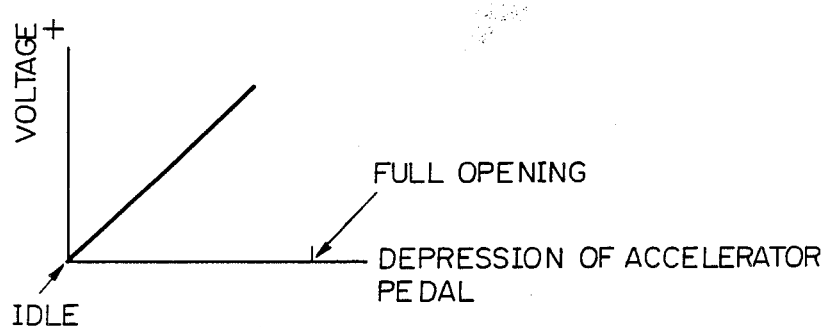
FIG. 2A shows a relationship between the depression of the accelerator pedal and the output level in the accelerator position sensor signal (SG1)

A detector 7 such as a potentiometer is connected to the accelerator pedal 1 for producing signals SG1 corresponding to the degree of depression of the acclerator pedal 1, as shown in FIG. 2A. In place of the potentiometer, the detector 7 may be constructed as an inductance type or variable electric capacitor type displacement detector.

Figure 2B:
FIG. 2B shows a relationship between the level of the signal SG1 and the engine speed data A.

Reference numeral 8 represents an engine speed control circuit for transforming the signal SG1 corresponding to the degree of depression of the accelerator pedal 1 into engine speed data A as shown in FIG. 2B, by using a selected function generator selected, in accordance with a sensed operating condition, from a plurality of function generators. The selection of the function generators is effected in such a manner that an optimum operation of the engine is attained in all modes by detecting, for example, whether the vehicle is running on a level surface, or on an up or down incline. As shown in FIG. 1, the control circuit 8 is provided with a plurality of function generators 8a, 8b, and 8c, which represent various relationships between the degree of depression of the accelerator pedal 1, i.e., the level of the signal SG1 from the sensor 7, and the degree of opening of the throttle valve 2c (FIG. 3A), i.e., the level of the output signal A. A switch 14 is provided for selecting the generator 8a, 8b, or 8c, which meets the requirements of the engine 2. The switch 14 is operated by a drive unit 15 so as to select one of the generators 8a, 8b, and 8c. The drive unit 15 is connected to a group of sensors, such as a load sensor 16 for detecting whether the fork-lift is carrying a load and for detecting the weight of the load, a sensor 17 for detecting the load applied to the engine 2, a sensor 18 for detecting the speed of the vehicle, and a manual selection switch 19 operated by an operator. The drive circuit 15 responds to signals from the group of sensors 16, 17, 18, and 19 in such a manner that one of the function generators 8a, 8b, and 8c is selected to obtain the engine speed data A most suitable for the particular operating condition sensed by the sensors 16, 17, 18, and 19.

The engine speed control circuit 8 is connected, via a multiplier 35, to the throttle actuator 5, so that the throttle actuator 5 operates the throttle valve 2c (FIG. 3A) and thus obtains the required engine speed.

Figure 3A:
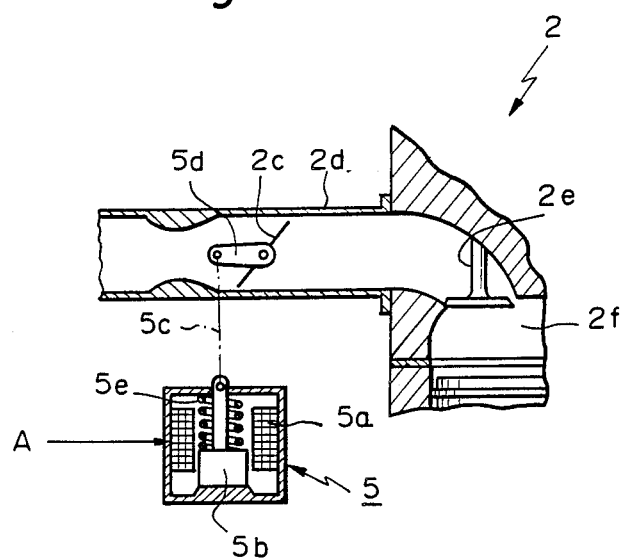
FIG. 3A shows a construction of the throttle actuator.
Figure 3B:
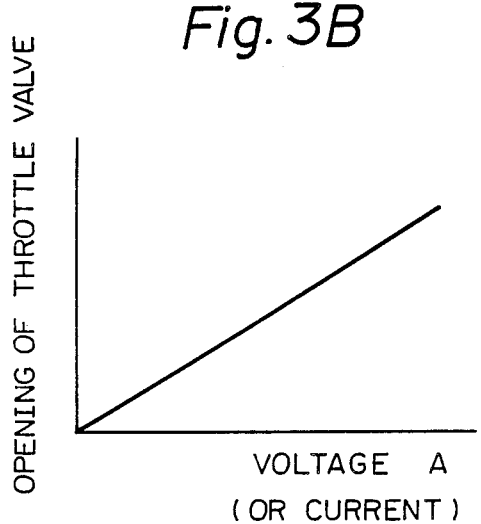
FIG. 3B shows a relationship between the engine speed data A and the opening of the throttle valve.

The actuator 5 can be constructed as shown in FIG. 3A. This construction is shown by way of explanation, and there is no intention of limiting the construction to this embodiment. The actuator 5 is provided with a solenoid 5a electrically connected to the engine speed control circuit 8, and receives the signal A therefrom. The actuator 5 further has a driving piece 5b arranged in the solenoid 5a to co-operate therewith. The driving piece 5b is connected to a throttle valve 2c of the engine 2 by means of a link 5c and a lever 5d connected to the throttle valve 2c. The stroke of the driving piece 5b is controlled in accordance with the electro-magnetic force applied to the piece 5b from the solenoid 5a against the force of a spring 5e. As a result, the opening of the throttle valve 2c by the piece 5b is controlled in accordance with the level of the signal A, as shown in FIG. 3B. Thus, the amount of air-fuel mixture introduced, via an intake pipe 2d and an intake valve 2e, to an engine combustion chamber 2f is correspondingly controlled. Note, when the level of the signal A is zero, the throttle valve 2c is moved to a fully closed or engine idling condition by the spring 5e, as shown in FIG. 3A.

In place of the solenoid actuator 5, a step motor can be employed. The step motor would be connected to the axis of the throttle valve 2c, and would attain rotation in accordance with the level of the signal A, to control the throttle opening.

The detector 7 is also connected to a swash plate controller 9 (FIG. 1), which transforms the manipulator signal SG1 into a signal E corresponding to a requirement related to the inclination of the swash plate 3e of the step-less transmission, i.e., the transmission ratio. In the controller 9, the manipulator signal SG1 is transformed into the signal E by using one of a selected function generators 9a, 9b, or 9c.

Figure 2C:
FIG. 2C shows a relationship between the level of the signal SG 1 and the transmission ratio data E.

As shown in FIG. 1, the controller 9 is provided with a plurality of function generators 9a, 9b and 9c, each representing a functional relationship between the input level of the signal, i.e., the degree of depression of the accelerator pedal 7, and an output level of the signal E (FIG. 2C). A switch 21 is provided for selecting the required function generator 9a, 9b, or 9c in accordance with the output from the sensors 16, 17, 18, and 19 to attain an optimum relationship between the depression of the accelerator pedal and the transmission ratio most suitable to the particular engine condition experienced at that time. In other words, the optimum relationship between the depression of the accelerator pedal and the transmission ratio is selected in accordance with the prevailing engine condition by detecting whether the vehicle is running on a level surface or on an incline. To effect this operation, the switch 21, similar to the switch 14, is connected to a switch drive circuit 22 which receives the outputs of the sensors 16, 17, 18 and 19, as already described with reference to the selection of the generators 8a, 8b, and 8c.

Figure 4:
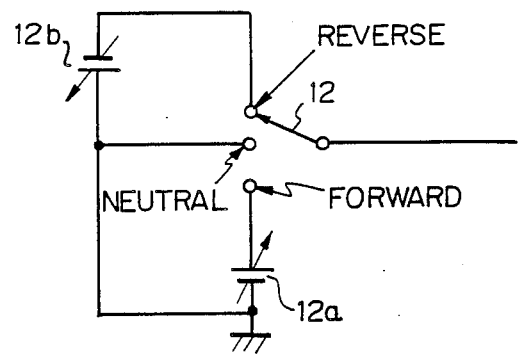
FIG. 4 shows a construction of the directional control lever position switch.

A multiplier 10 is connected to the swash plate controller 9 and to a shift lever 11 by means of a detector 12. The lever 11 acts as a manipulator to control the direction of movement of the vehicle. For example, when the lever 11 is moved to a forward position, the vehicle will move in a forward direction, and when the lever is moved to a reverse position, the vehicle will move backwards. The detector 12 may be constructed, as shown in FIG. 4, by a three-way contact switch having contacts connected to a positive electric source circuit 12a (i.e., forward), to a negative electric source circuit 12b (i.e., reverse), and directly to ground (i.e., neutral). When the lever 11 is in the forward position, the detector 12 provides a positive signal (logic signal +1). When the lever 11 is in the reverse position, the detector provides a negative signal (logic signal −1). When the lever 11 is in the neutral position, the detector 12 does not output a signal (logic signal 0). Namely, the sign of the signal E is reversed when the lever 11 is in the reverse position, and the signal E is made to zero when the lever 11 is in the neutral position.

Figure 5:
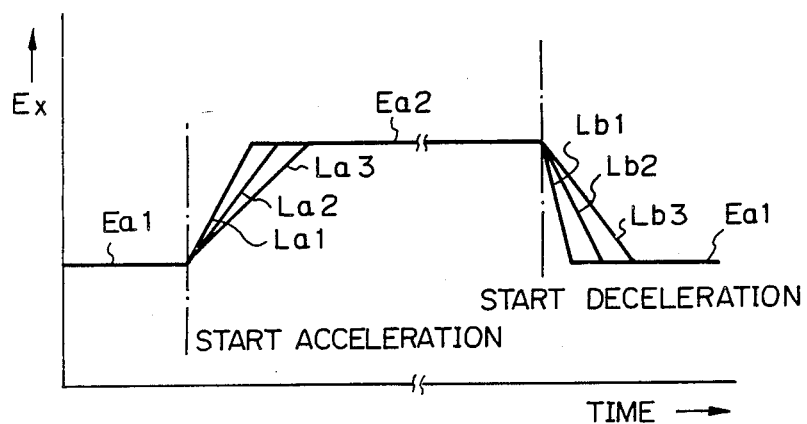
FIG. 5 is a graph explaining the transmission ratio data Ex change during the acceleration and the deceleration, respectively.

The multiplier 10 is connected to a lamp signal generator 30, which is essentially constructed as an integrating circuit for changing the level of the output signal Ex at a controlled rate when the level of the signal Ea indicating the required data of the transmission ratio is abruptly changed. For example, as shown in FIG. 5, when the level of the signal Ea from the multiplier 10 is changed from the value Ea1 to Ea2 (larger than Ea1) due to a depression of the accelerator pedal while maintaining the forward position of the lever 11, the level of the output signal Ex is changed from the value Ea1 to the value Ea2 gradually at a selected predetermined speed of La1, La2, or La3. As shown in FIG. 1, the lamp circuit 30 includes, three integrating units 30a, 30b, and 30c, which provide the characteristics La1, La2, and La3 (or Lb1, Lb2, and Lb3), respectively. A switch 31 selectively connects the multiplier 10 to a desired one of the integrating units 30a, 30b, or 30c. The switch 31 may be manually operated by an operator.

Figure 6:
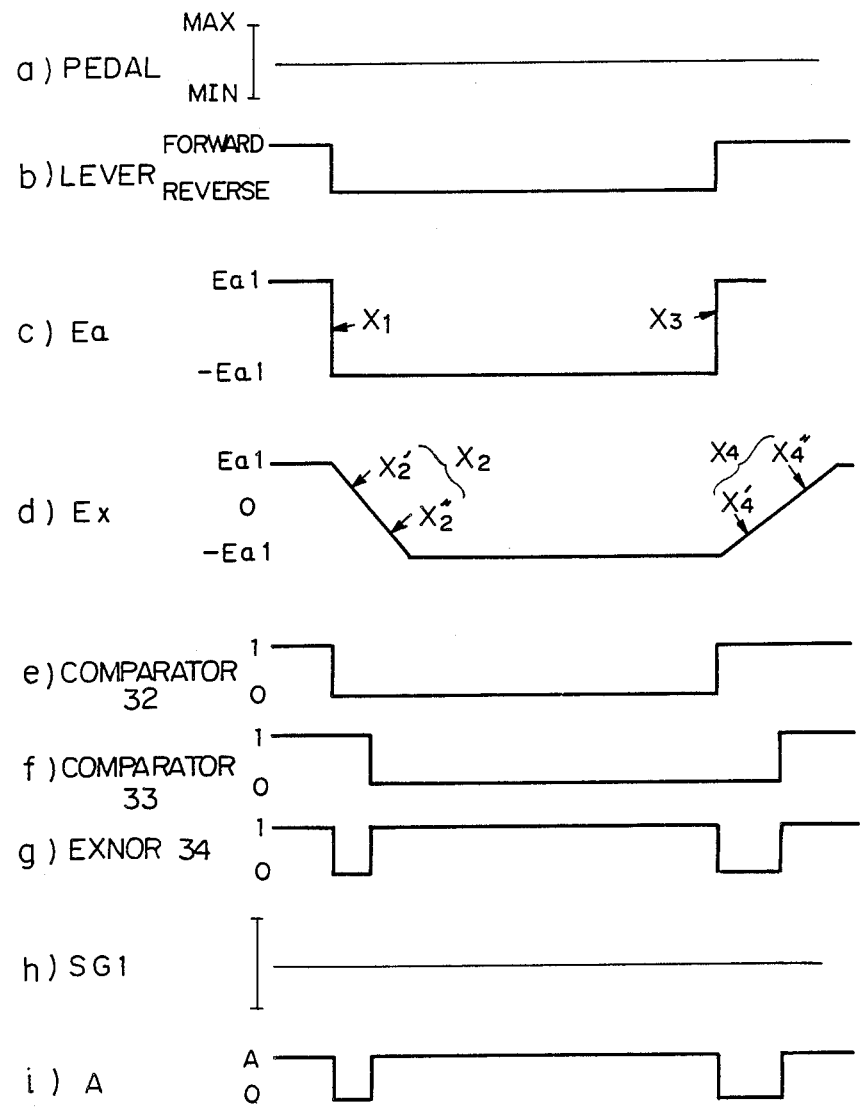
FIGS. 6a-i show timing charts for explaining the operation of the embodiment shown in FIG. 1.

When the lever 11 is moved from the forward position to the reverse position while a constant degree of depression of the accelerator pedal 1 is maintained, as shown in FIG. 6(a), the level of the signal Ea from the multiplier 10 is immediately changed from the level Ea1 to −Ea1, as shown by a line X1 in FIG. 6(c), and the level of signal Ex from the lamp circuit 30 is gradually changed form the level Ea1 to the value −Ea1 at a predetermined rate selected by the switch 31, as shown by a line X2 in FIG. 6(d). In this case, the data of Ex at a state where the level of the signal Ex is changed from the value Ea1 to zero, as shown by the line section X2' in FIG. 6(d), corresponds to transmission ratio data for operating the swash plate 3e and decelerating the vehicle moving in a forward direction. The data of Ex at a state where the level of the signal Ex is changed form zero to −Ea1, as shown by a line section X2" in FIG. 6(d), corresponds to transmission ratio data for operating the swash plate 3e and accelerating the vehicle which is now moving backward.

When the lever 11 is moved from the reverse position to the forward position as shown in FIG. 6(b), the level of the signal Ea from the multipier 10 is immediately changed from the value −Ea1 to the value Ea1, as shown by the line X3 in FIG. 6(c), and the level of the signal Ex from the lamp circuit 30 is gradually changed as shown by the line X4 in FIG. 6(d). In this case, the data of Ex at a state where the level of the signal Ex is changed from −Ea1 to zero, as shown by a section line X4' in FIG. 6(d), corresponds to data for operating the swash plate 3e for decelerating the vehicle, which is still moving backward. The data of Ex at a state where the level of the signal Ex is changed from zero to Ea1, as shown by a section line X4" in FIG. 6(d), corresponds to data for operating the swash plate 3e for accelerating the vehicle, which is now moving forward.

In FIG. 1, the lamp circuit 30 is connected to the swash plate actuator 6, which is connected to the swash plate 3e of the step-less transmission 3 to control the angle of the swash plate 3e and thus control the transmission ratio.

Figure 7:
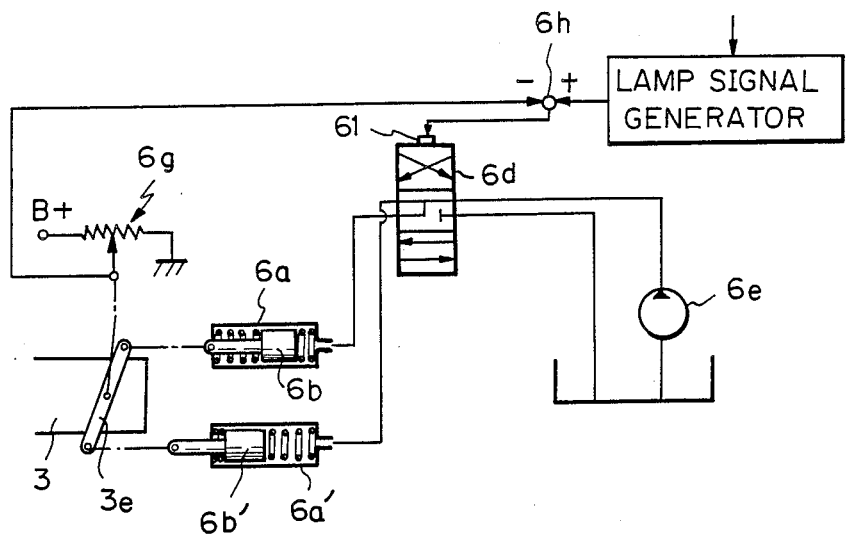
FIG. 7 is a schematic diagram of the construction of the swash plate actuator shown in FIG. 1.
Figure 8:
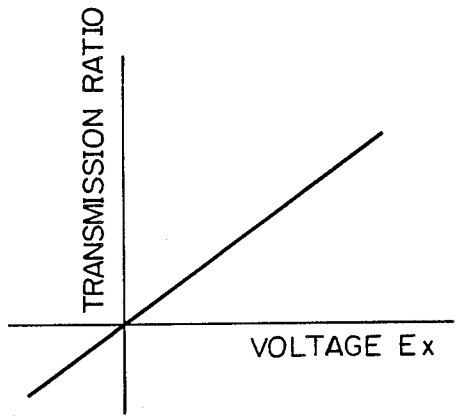
FIG. 8 shows a relationship between the transmission ratio data Ex and the transmission ratio.

FIG. 7 is a schematic illustration of the actuator 6. This construction is shown only by way of explanation and is not limited thereto. The actuator 6 comprises a pair of double-action hydraulic cylinders 6a and 6a' having pistons 6b and 6b' connected to opposite ends of a lever 6c, which is connected to the swash plate 3e. An electro-magnetic switching valve 6d is arranged between the cylinders 6a and 6a' and a hydraulic pump 6e. The pistons 6b and 6b' are moved left or right by selective operation of a switching valve 6d. A lamp signal is applied to a solenoid 61 of the switching valve 6d from the lamp signal generator 30. A position sensor 6g as a potentiometer is connected to the swash plate 3e, to detect the angular position of the plate 3e. The potentiometer 6g is connected to a feedback point 6h. A signal, which is the deviation between the calculated position of the swash plate 3e and the detected position of the swash plate 3e, is supplied to the solenoid 61. Thus, the position of the pistons 6b and 6b' is controlled in accordance with that deviation, and thus the position of the swash plate 3e, i.e., the transmission ratio, is controlled in accordance with the level of the signal Ex, as shown in FIG. 8. In place of the electric feedback system, a pneumatic feedback system, which is well known, can be employed for operating the swash plate 3e.

The system according to the present invention further includes a device for modifying the level of signal A from the engine speed control circuit 8 by detecting deceleration of the engine. As shown in FIG. 1, the device is constructed by a first comparator 32, a second comparator 33, and an EXNOR gate 34. The first comparator 32 has a first input connected to the multiplier 10, to receive the signal Ea corresponding to the required angle of the swash plate 3e, and a second input connected to the ground, thus providing a signal level "1" when Ea is larger than zero and a signal level "0" when Ea is smaller than zero, as shown in FIG. 6(e). The second comparator 33 has a first input connected to the lamp signal generator 30, to receive the signal Ex therefrom, and a second input connected to the ground, thus providing a signal level "1" when Ex is larger than zero, and a signal level "0" when Ex is smaller than zero, as shown in FIG. 6(f).

The EXNOR gate 34 has inputs connected to the first and the second comparators, respectively. As is well known to those skilled in this art, the EXNOR gate 34 issues a signal SG2 having a level "0" when the logical values at the inputs are different. This difference occurs when the level of the lamp signal Ex is, in FIG. 6(d), changing from Ea1 to 0, as shown by the line X2' in FIG. 6(d), or is changing from −Ea1 to 0, as shown by the line X4' in FIG. 6(d), to attain a deceleration operation. The EXNOR gate 34 issues a "1" level signal when the logic levels at the inputs thereof are identical, i.e., the engine is in a steady state or acceleration state. As will be clear from the above-mentioned operation of the EXNOR gate 34, it is thus possible to detect a condition wherein the step-less transmission 3 is operated by the signal Ex to attain deceleration.

The EXNOR gate 34 is connected to a multiplier 35 for providing a signal corresponding to the product of the signal A from the engine speed control unit 8 and the signal SG2 from the EXNOR gate 34. Therefore, when the "1" level signal appears at the output of the EXNOR gate 34, i.e., the engine is in a steady or acceleration state, the data A from the circuit 8 indicating the requirement of the engine speed is transmitted to the throttle actuator 5 while maintaining its value, so that the opening of the throttle valve 2c (FIG. 3A) is controlled accordingly. Contrary to this, when the "0" level signal appears at the output of the EXNOR gate 34, i.e., the engine is in a deceleration state, the data A is forced to zero and is transmitted to the throttle actuator 5. In this case, the throttle actuator 5 brings the throttle valve 2c (FIG. 3A) to the engine idling position, as already described.

Operation of the first embodiment of the present invention will be now described.

When the lever 11 is moved from the forward position to the reverse position while maintaining a constant degree of depression of the accelerating pedal 1, the value of the transmission ratio Ea is immediately changed from Ea1 to −Ea1, as shown in FIG. 6(b). The value of the transmission ratio data Ex from the lamp signal generator 30c is changed from Ea1 to −Ea1 gradually, as shown by the line X2 in FIG. 6(d), the rate of this change being determined by the selection of the switch 31. Under such control, the transmission ratio is gradually decreased, as shown by the line X2' in FIG. 6(d), to attain deceleration, and is gradually increased, as shown by the line X2'' in FIG. 6(d), to attain acceleration. Thus, this control of the transmission ratio attains a shock-less deceleration and acceleration changeover.

During the deceleration, wherein the value of the transmission ratio data Ea is decreased to zero, as shown by the line X2' in FIG. 6(d), the comparator 31 issues a logic signal "0" and the comparator 32 issues the logic signal "1", so that the EXNOR gate 34 issues a logic signal "0". As a result, the engine speed data A directed to the throttle actuator 5 becomes zero, as shown by FIG. 6(i). Therefore, the throttle valve 2c is returned to the fully closed position, and the engine is placed in the idling condition.

When the transmission ratio data A has attained the value of zero, the gate 34 issues the logic signal "1", and the transmission ratio data A is transmitted to the actuator 5. Thus, the actuator 5 controls the throttle valve opening in accordance with the value of A. Since the value of the transmission ratio data Ex is changed as shown by the line X2'' in FIG. 6(d), the engine is in an acceleration condition until the ratio A has attained the value −Ea1. In this case, the transmission ratio is changed in accordance with the predetermined degree selected by the switch 31, and thus an appropriate and smooth acceleration operation can be attained.

When the lever 11 is moved from the reverse position to the forward position, the value of the transmission ratio data E from the transmission ratio control circuit 9 is immediately changed from −Ea1 to Ea1, as shown by the line X3 in FIG. 6(c). However, the content of the transmission ratio data Ex from the lamp circuit 30 changes gradually, as shown by the line X4 in FIG. 6(d). Thus, the engine is in the deceleration condition until the value of Ex is set to zero as shown by the line X4' in FIG. 6(d). During the deceleration, the first comparator 31 issues a logic signal "1", while the second comparator 32 issues a logic signal "0", and thus the EXNOR gate 34 issues a logic signal "0" which is transmitted to the multiplier 35. Accordingly, the value of the engine speed data A directed to the throttle actuator 5 becomes zero, so that the throttle actuator 5 returns the throttle valve 2c to the idling position.

When the value of Ex reaches zero, the comparator issues a logic signal "1", causing the EXNOR gate 34 to provide a logic "1" signal, so that the multiplier outputs a signal A from the engine speed controller 8 to the throttle actuator 5. Thus, the degree of opening of the throttle valve 2c is controlled in accordance with the value of A.

As will be clear from the above described operation of the embodiment, the throttle valve 2c is controlled to the idling position during deceleration caused by the movement of the lever 11 between the forward position and the reverse position while the accelerator pedal is depressed. Because the throttle valve 2c is controlled to the idling position, an effective engine braking is attained during deceleration. Thus, it is easy for the operator to control the vehicle speed. Further, any abrupt increase in engine speed during deceleration is prevented, thus noise is suppressed and the fuel consumption efficiency increased.

Figure 9:
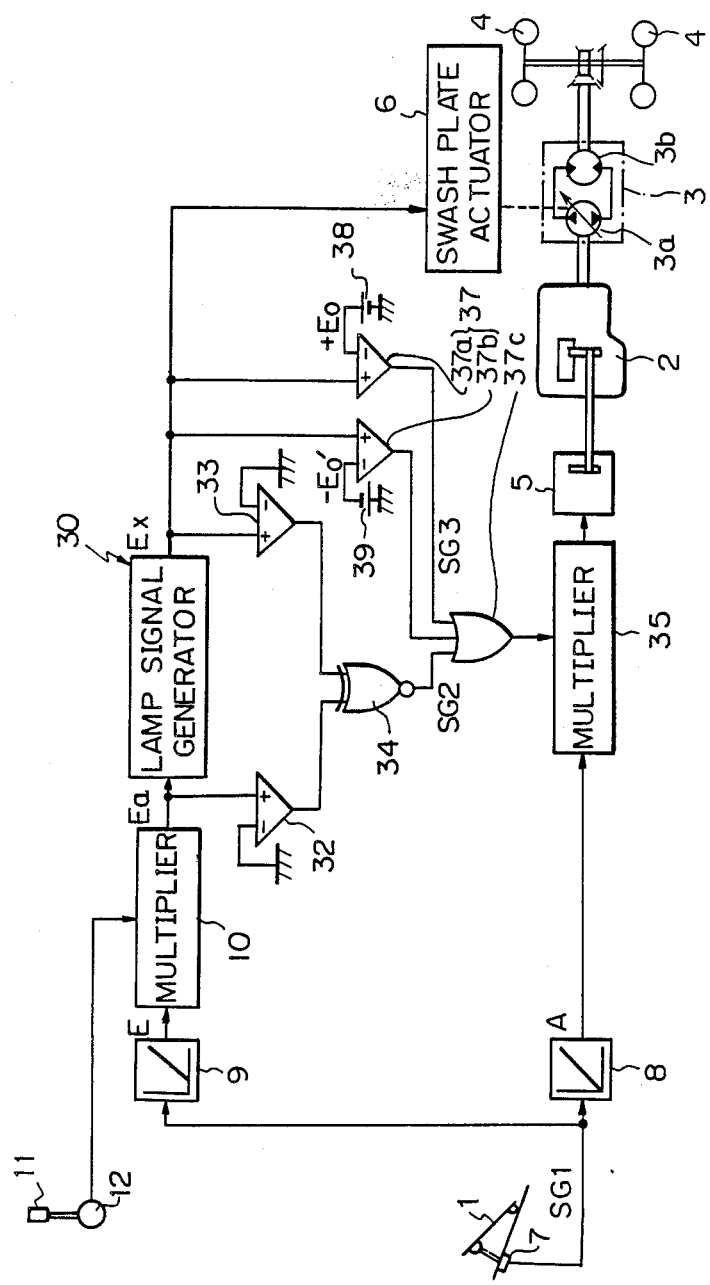
FIG. 9 shows a second embodiment of the present invention.

FIG. 9 shows a second embodiment of the present invention. This embodiment differs from the first embodiment in that it additionally includes a window device 37 for detecting the vehicle speed area near zero and includes a device for detecting that the vehicle speed is decreased to near zero during deceleration and for allowing the passage of the A signal from the engine speed controller 8 without being corrected. The device 37 includes a third comparator 37a, a fourth comparator 37b and an OR gate 37c. The comparator 37a has an input connected to the output of the lamp circuit 30 to receive the Ex signal, and an input connected to a voltage generating circuit 38 for providing a constant level $+E0$ near 0 volt as shown in FIG. 10(d), so that it is possible to detect a condition wherein the vehicle speed is decreased to near zero during deceleration caused by changing the manipulation lever 11 from the reverse position to the forward position. The comparator 37b has an input connected to the output of the lamp circuit 30 to receive the Ex signal and an input connected to a voltage generating circuit 39 for providing a constant level $-E0'$ near 0 volt as shown in FIG. 10(d), so that it becomes possible to detect a condition wherein the vehicle speed is decreased to a speed near zero during deceleration caused by changing the manipulation lever 11 from the forward position to the reverse position. These comparators 37a and 37b are, together with the EXNOR gate 34 as already explained with regard to the first embodiment, connected to the OR gate 37c. The OR gate 37c is connected to the multiplier 35, also described with reference to the first embodiment.

The remaining construction of the second embodiment is substantially the same as the construction of the first embodiment. Therefore, a detailed explanation of the same is unnecessary since the same reference numerals are used to denote the same operation in both embodiments. Note, the controllers 8 and 9 may be constructed as realized in FIG. 1—1 so that they have a plurality of transducers. The lamp circuit 30 also may be constructed so that it has a plurality of transducers as realized in FIG. 1.

The comparators 37a and 37b detect a range of the value of data Ex near zero delimited by the dotted lines in FIG. 10(d), so as to provide a logic signal "1" to the OR gate 37c. The comparators 37a and 37b issue a logic signal "0" when the value of data Ex is in a range other than near zero.

When the value of the transmission ratio data Ex from the lamp circuit 30 is changed from Ea1 to 0 attain the deceleration due to the movement of the lever 11 from the forward position to the reverse position, the comparator 37a issues a logic signal "1", as shown by a line X5 in FIG. 10(h), when the value Ex is decreased to the predetermined value E0 which is slightly larger than zero. This causes the OR gate 37c to issue a logic signal "1" as shown by FIG. 10(j) to the multiplier 35, permitting the transmission of the data A from the engine speed controller 8 to the throttle actuator 5. This operation also occurs when the transmission ratio data Ex is changed from −Ea1 to zero to attain deceleration due to the movement of the lever 11 from the reverse position to the forward position. The state of the comparator 37b is changed from "0" to "1", as shown by X6 in FIG. 10(i), when the value to Ex from the lamp circuit 30 is increased to the value −E0 slightly lower than zero, so that the OR gate 37c issues a logic signal "1" to the multiplier 35, allowing the data A to be transmitted to the throttle actuator 5, as shown in FIG. 10(k).

As will be easily seen from the above, in the second embodiment, the engine speed data A from the controller 8 can be transmitted to the throttle actuator 5 before the transmission ratio data Ex from the lamp circuit 30 has attained the value of zero during deceleration, as shown by X2' or X4' in FIG. 10(d). As a result, the throttle valve 2c is set at a degree of opening corresponding to the value of data A, which is, of course, larger than the throttle opening for engine idling. Thus, the vehicle can attain a smooth acceleration without time lag when the transmission ratio data Ex is moved into the acceleration range, as shown by the line X2" or X4 in FIG. 10(d).

Figure 11:
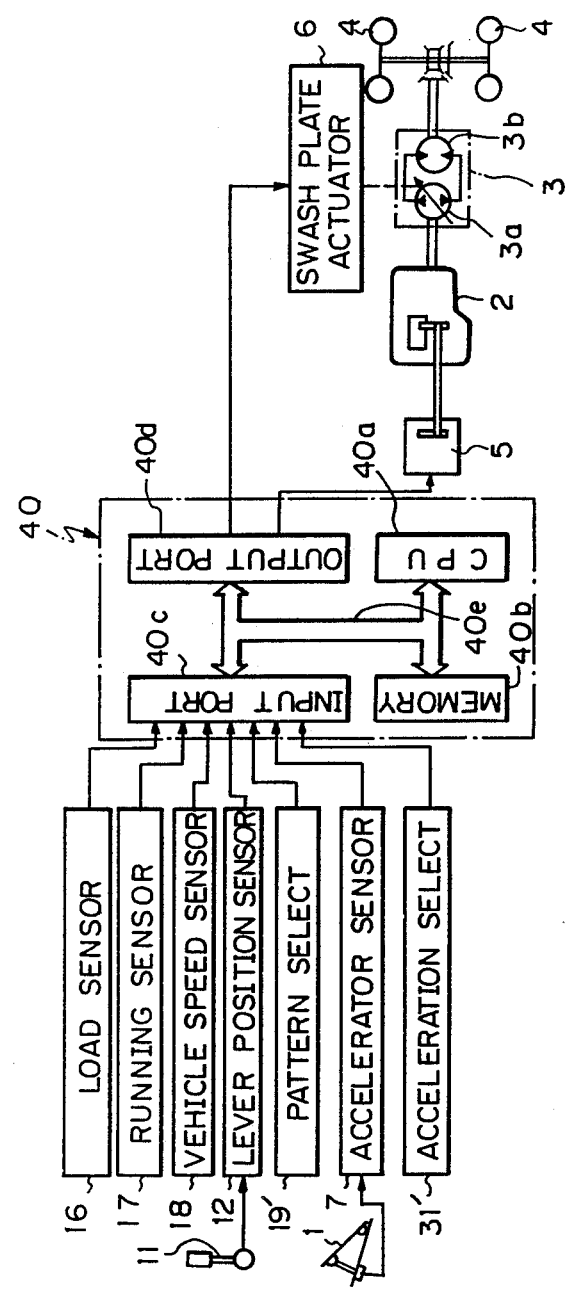
FIG. 11 shows the construction of a third embodiment of the present invention.

FIG. 11 shows an embodiment of the present invention realised by a microcomputer system for operating the throttle actuator 5 and the swash plate actuator 6. Note, the microcomputer system can operate not only the parts 5 and 6 but also other driving mechanisms. These mechanisms are not shown in the drawing as they are not directly related to the present invention.

The microcomputer system 40 essentially includes a central processing unit(CPU) 40a, a memory 40b, input port 40c, an output port 40d, and a bidirectional bus 40e connecting these parts to each other. The input port 40c is connected to a group of sensors similar to those described in the first embodiment in FIG. 1. The sensor group includes a load sensor 16, a vehicle running state sensor 17, a vehicle speed sensor 18, a lever position sensor 12, a pattern select sensor 19', an accelerator pedal position sensor 7, and an acceleration ratio select sensor 31'. The load sensor 16 detects the carriage load condition of the fork lift; the running sensor 17 detects the load of the engine during running; the speed sensor 18 detects the speed of the fork lift; the lever position sensor 12 detects the position of the lever 11; the pattern select sensor 19' detects the position of the pattern selection switch 19 operated by the operator, as described with reference to FIG. 1; the accelerator pedal position sensor 7 detects the degree of depression of the accelerator pedal 1; and the acceleration select sensor 31' detects a position of the switch 31 manually operated by the operator for obtaining a required acceleration rate characteristic. The signals from these sensors are introduced into the input port 40c.

The CPU 40a executes programs stored in the memory 40b, and signals issued from the output port 40d are directed to the throttle actuator 5 and to the swash plate actuator 6.

Figures 2, 12A:
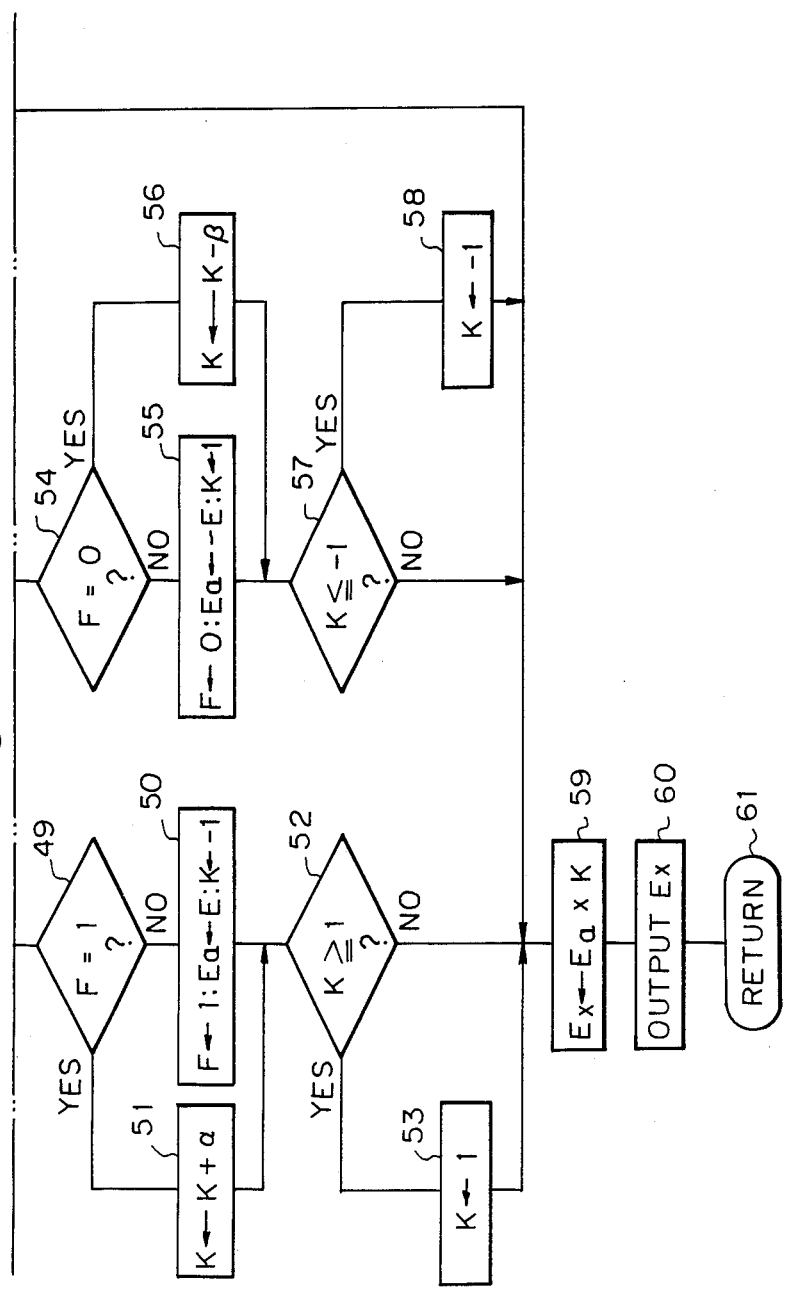
Figure 12B:
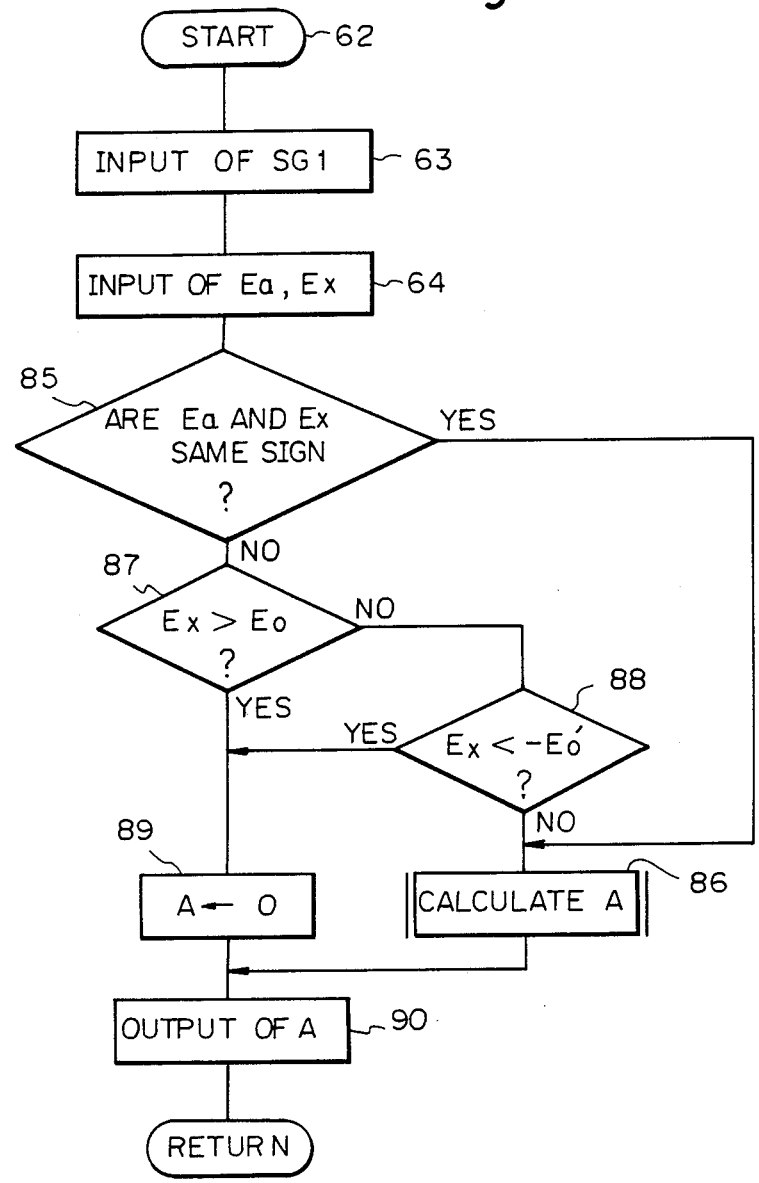
FIG. 12B is a flow chart showing the operation of the embodiment shown in FIG. 11.

FIGS. 12A and 12B are flowcharts of the operation of the throttle actuator 5 and the swash plate actuator 6 in accordance with the present invention. The operation of this embodiment is substantially the same as the second embodiment shown in FIG. 10.

FIG. 12A is a flowchart of the operation of the swash plate actuator 6. This routine is carried out at predetermined time intervals. At point 42 the routine enters into execution. At point 43, the signal SG1 from the accelerator pedal sensor 7 is input. At point 44, the signal from the lever position sensor 12 is input. At point 45, it is judged from the signals of the lever position sensor 12 whether the lever 11 is in the neutral position. When the lever 11 is in the neutral position, the program proceeds to point 46 where 0 is moved to the memory area E for storing the transmission ratio data.

Figure 12C:
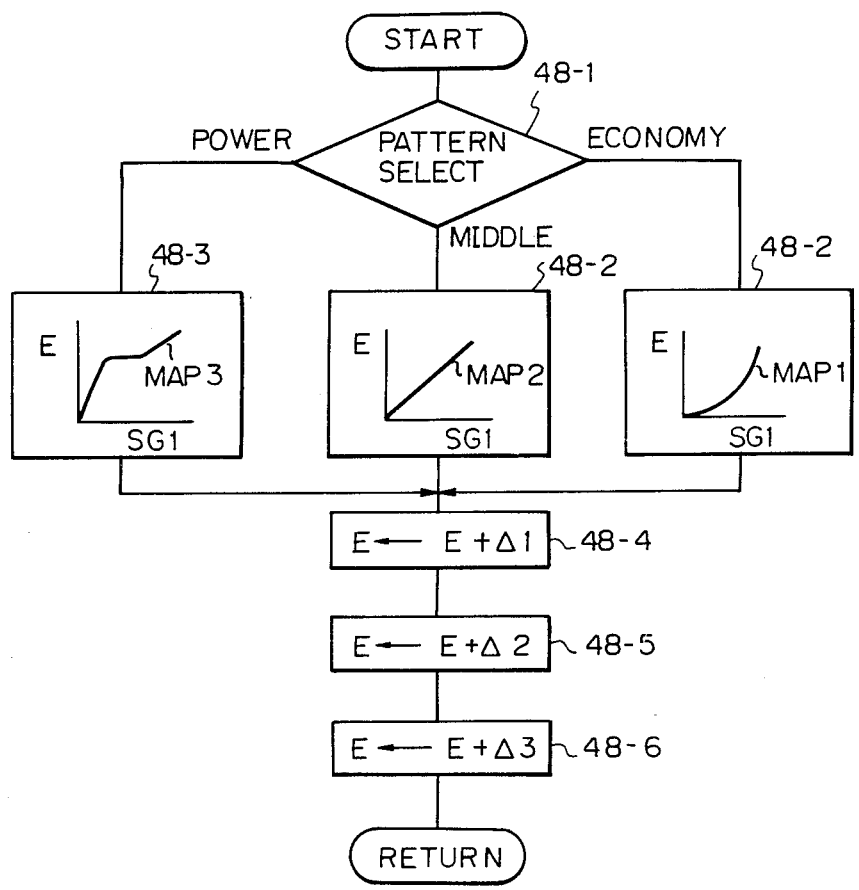
FIG. 12C is a flow chart showing the operation of the embodiment shown in FIG. 11.

When the lever 11 is not in the neutral position the routine goes from point 45 to point 47, where calculation is made of a data E of the required transmission ratio corresponding to the sensed degree of depression of the accelerator pedal 1 from a selected map of the functional relationship between the degree of depression and the transmission ratio E, which is stored in the memory 40b. In this case, several maps are stored in the memory 40b. By considering various information obtained by the carriage load sensor 16, the engine load sensor 17, the vehicle speed sensor 18, and a pattern select sensor 19', one of the maps is selected for calculating E. FIG. 12C is a detailed flow chart for attaining the calculation of E. At point 48-1, the position of the pattern select switch 19 is judged. When the position is economy, the routine goes to point 48-2 and a value of E is calculated by using a map 1, which is a relationship between SG1 and E, suitable to attain a high fuel economy. When the pattern select switch 19 is in the middle position, the routine goes to point 48-2, to select a map 2, which provides a linear relationship between SG and E. A value of E is calculated in accordance with the level of SG1. When the pattern select switch is in a power position, the routine goes to point 48-3 to select a map 3, to provide a relationship for attaining a high engine output. A value of E is calculated in accordance with the level of SG1.

Figure 12D:
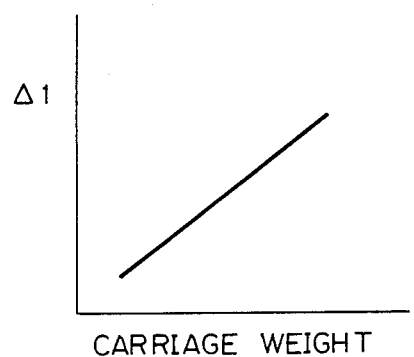
FIG. 12D shows a correction characteristic curve with respect to carriage weight.
Figure 12E:
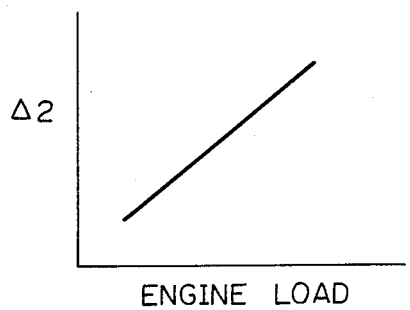
FIG. 12E shows a correction characteristic curve with respect to engine load.
Figure 12F:
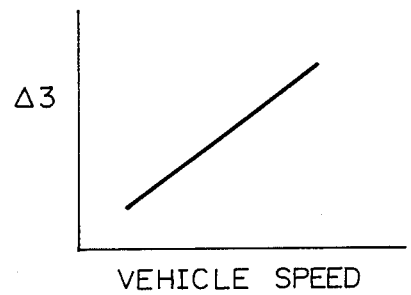
FIG. 12F shows a correction characteristic curve with respect to vehicle speed.

At point 48-4, the value of E is corrected by adding the correction amount Δ1, the value of which is determined in accordance with the carriage weight sensed by the sensor 16 (FIG. 12D).

At point 48-5, the value of E is corrected by adding the engine load correction amount Δ2, the value of which is determined in accordance with the engine load sensed by the sensor 17 (FIG. 13E).

At point 48-6, the value of E is further corrected by adding the vehicle speed correction amount Δ3, the value of which is determined in accordance with vehicle speed sensed by the sensor 18.

To return to FIG. 12, at point 48, the position of the lever 11 is determined. When the lever 11 is in the forward position, the program flows to point 49 where it is judged whether flag F is 1. This flag F is set when the lever 11 is moved to the forward position, and reset when the lever 11 is moved to the reverse position. At the moment when the lever 11 is moved to the forward position the flag F is zero, and the routine then goes to point 50 where the flag F is set, E is moved to Ea1 and the correction factor K is initialized to $-1$. When the Flag F is 1, the routine goes to point 51, where the correction factor K is incremented by $\alpha$. The value of $\alpha$ corresponds to the degree of inclination of the line X4 in FIG. 10($d$), and is determined by the position of the switch 31 detected by the sensor 31'.

At point 52, it is judged whether K has attained the value of 1. When the value of K is larger than 1, the routine goes to point 53, where the value of K is fixed at 1.

When the lever 11 is in the reverse position, then the program proceeds from point 48 to point 54, where it is judged whether the Flag F is 0. At the moment when the lever 11 is moved from the forward position to the reverse position, the Flag F is 0, and the program proceeds to point 55 where the Flag F is set, $-$E moved to Ea, and the correction factor K initialized to 1. When the Flag F is 0 the routine goes to point 56, where the correction factor K is decremented by $\beta$. The value of $\beta$ corresponds to the inclination of the line X2 in FIG. 10($d$) and is determined by the position of the switch 31 detected by the sensor 31'. At point 57, it is judged whether the correction factor K has reached the value of $-1$. When the value is less than $-1$, the program goes to point 58 where the correction factor K is fixed at $-1$.

After the value of K is thus calculated the routine goes to point 59, where the value of Ea calculated at point 50 or 55 is multiplied by the correction factor K and is stored in a memory area Ex for storing the transmission ratio data introduced to the swash plate actuator 6.

At a point 60, the data of Ex is set to the output port 40$d$ which is connected to the actuator 6, and the swash plate 3$e$ of the step-less transmission 3 is controlled to the calculated transmission ratio.

Figure 10:
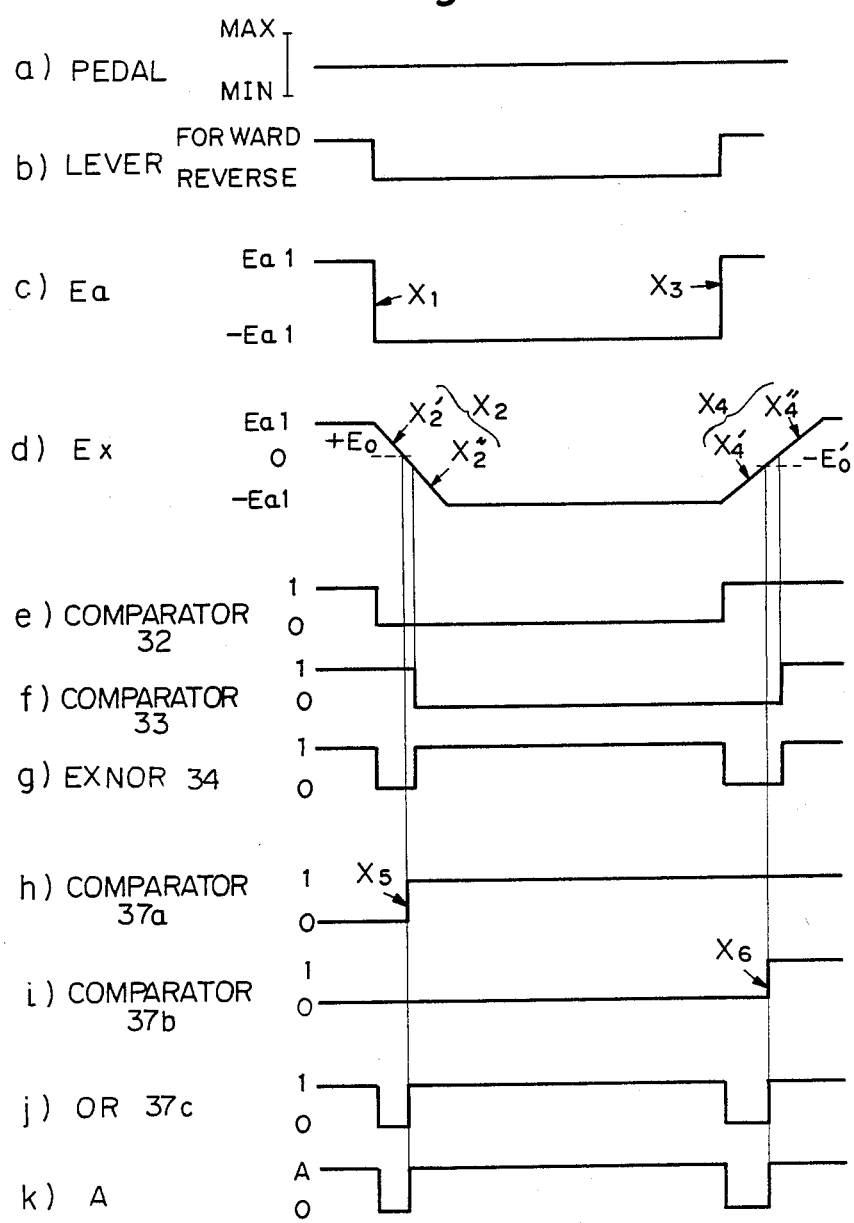
FIGS. 10a-k show timing charts for explaining the operation of the embodiment shown in FIG. 9.

As will be clear from the explanation given in the flowchart, the value of the transmission rate data Ex changes as shown by the line X2 in FIG. 10($d$) just after the lever 11 is moved from the forward position to the reverse position, since the value of the correction factor K is gradually decreased at point 56 of FIG. 12A. The value of the data Ex is changed, as shown by the line X4 in FIG. 10($d$), just after the lever 11 is moved from the reverse position to the forward position, since the value of the correction factor K is gradually increased as shown by the line X4 in FIG. 10($d$). During the steady state condition, the correction factor K is maintained at 1 when the lever 11 is in the forward postion, and at $-1$ when the lever 11 is in the reverse postion.

FIG. 12B is a flowchart of the operation of the throttle actuator 5. This routine is effected at predetermined time intervals, and therefore, can be combined with the routine of FIG. 12A. At point 62, the routine enters into execution. At point 63, the data SG1 representing the degree of depression of the accelerator pedal 1 is input. At point 64, data representing the transmission ratio Ea and Ex is input. This data is calculated at steps 50 or 55 and 59, respectively, in FIG. 12A. At point 85, it is judged whether Ea and Ex have the same sign. When this judgement is positive the engine is in a steady state or acceleration condition. The routine then proceeds to point 86 where the data A representing the throttle opening degree requirement is calculated in accordance with the detected degree of depression of the accelerator pedal 1 by using a selected functional relationship (map) between the degree of depression of the accelerator pedal 1 and the value A of the degree of opening of the throttle valve 2$c$. In this case, several maps representing different relationships are stored in the memory 40$b$. By considering various information obtained by the group of sensors 16, 17, 18 and 19', one of the maps is selected for the calculation in step 86. Since the detail of the routine is similar to FIG. 12C for calculating E, an explanation is omitted.

When the judgement at step 85 is negative, it is considered that the vehicle is now in a deceleration state, as will be seen from FIG. 10($c$) and ($d$). The routine then proceeds to point 87 where it is judged whether Ea is larger than E0. When Ea is larger than E0, the vehicle is in a decelerating state, as shown by the line X2' in FIG. 10($d$), caused by movement of the lever 11 from the forward position to the reverse position while the speed is slightly higher than zero. When the result of the judgement is "no" at point 87, the routine then proceeds to point 88 where it is judged whether Ea is smaller than $-$E0'. When Ea is smaller than $-$E0, the vehicle is in a decelerating condition, as shown by the line X4' in FIG. 10($d$), caused by movement of the lever 11 from the reverse postion to the forward position, while the speed is slightly lower than zero. Where the judgement at point 87 or 88 is positive (deceleration), the routine then proceeds to point 89 where the value of A is set at zero, and the output port 40$d$ issues a command to the throttle actuator 5 so that the throttle valve 2$c$ is moved to the engine idling position.

When the vehicle speed is decreased or increased to a value near zero during deceleration by changing the lever 11 from the forward position to the reverse position, and vice versa, the result of the judgement at point 87 and 88 is "no", and therefore, the routine goes to step 86 to calculate A in accordance with the amount of depression of the accelerator pedal 1.

At point 90, the data A is moved to the output port and the throttle actuator 5 is operated accordingly.

Figure 13:
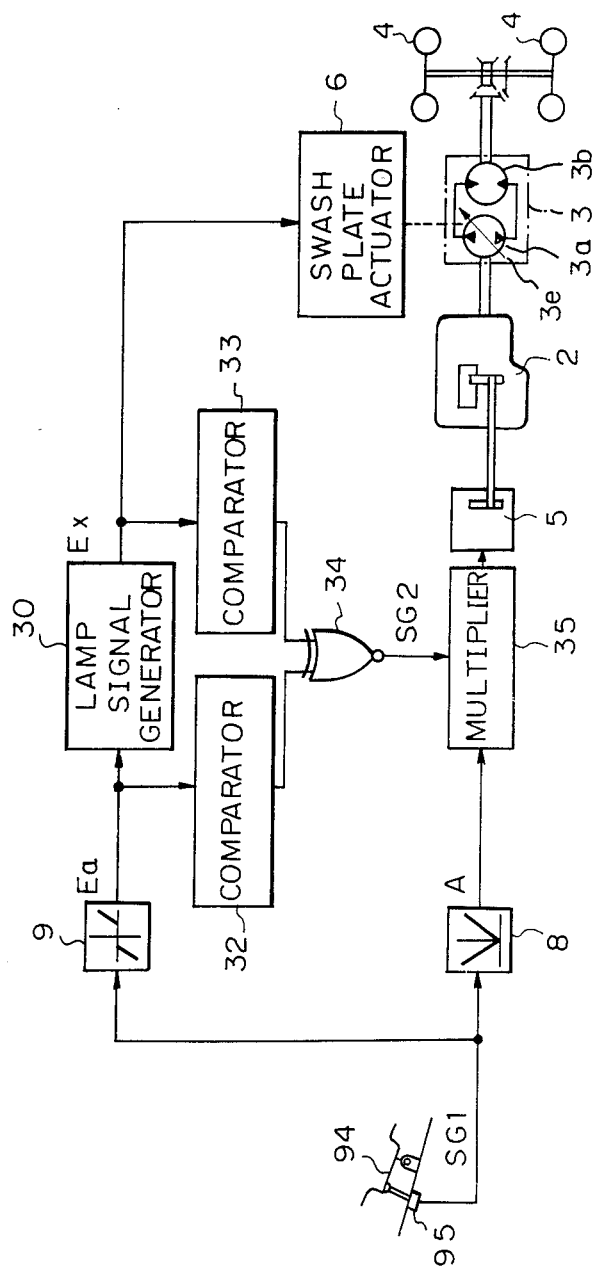
FIG. 13 shows a fourth embodiment of the present invention wherein a seesaw type accelerator pedal is employed.

In the embodiment shown in FIG. 13, a seesaw type of accelerator pedal 94 is employed, which is capable of controlling the movement of the vehicle in both the forward and reverse directions. Therefore, the lever 11 as shown in FIG. 1 is eliminated.

Figure 14A:
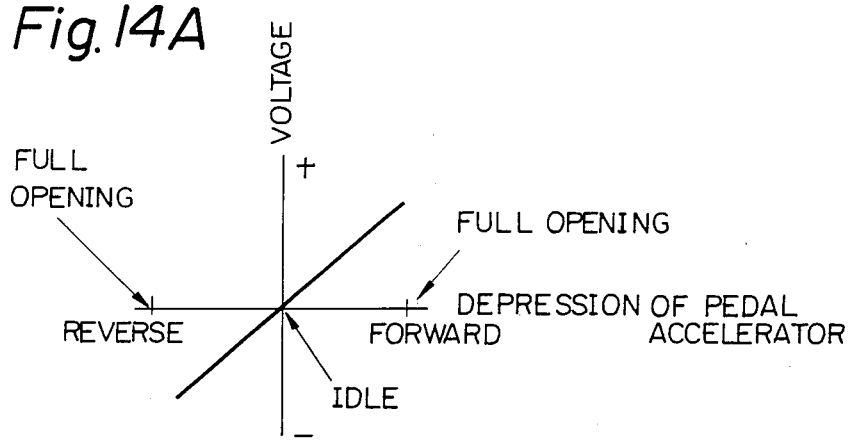
FIG. 14A shows the relationship between the degree of depression of the accelerator pedal and the voltage level of the position sensor.

In this embodiment, depression of the pedal 94 in an anti-clockwise direction in FIG. 13 induces a forward movement of the vehicle, and depression of the pedal 94 in the clockwise direction induces a reverse movement of the vehicle. A sensor 95 is connected to the accelerator pedal 94. The position sensor 95 issues an electric signal having a level which changes in accordance with the degree of depression of the accelerator pedal 94, as shown by FIG. 14($a$). When the accelerator pedal 94 is depressed to induce forward movement the voltage output by the sensor 95 is positive. When the pedal 94 is depressed to induce reverse movement, the voltage output by the sensor 95 is negative.

Figure 14B:
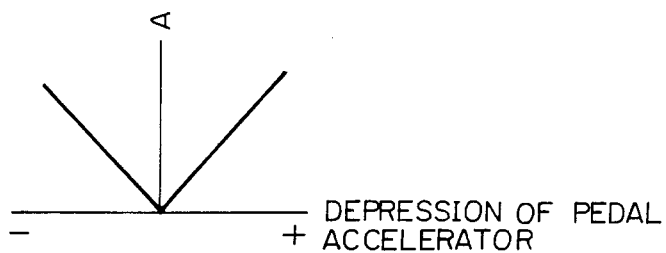
FIG. 14B shows the relationship between the degree of depression of the accelerator pedal and the engine speed data A.

An engine speed controller 8 is connected as a function generator to the accelerator position sensor 95. The function generator 8 issues a signal A introduced to the throttle actuator 5 via the multiplier 35, as shown in FIG. 14($b$). When the accelerator pedal 94 is depressed to induce forward movement, the level of A changes as shown in the right half of FIG. 14(b), and when the accelerator pedal 94 is depressed for reverse movement, the level of A changes as shown in the left half of FIG. 14(b). This means that the function generator 8 issues a positive signal representing the degree of depression of the accelerator pedal 94 irrespective of the direction of movement induced by that depression.

Note, the controller 8 can comprise a plurality of function generators representing different relationships between the depression of the accelerator pedal 94 and the sign of the voltage output by the sensor 95. These are selected in accordance with engine conditions, as in the first embodiment described with reference to FIG. 1.

Figure 14C:
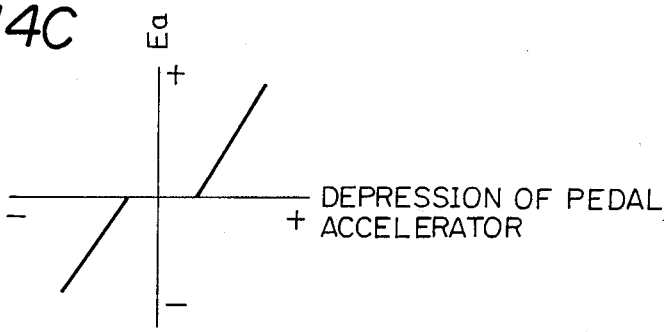
FIG. 14C shows the relationship between the degree of depression of the accelerator pedal and the transmission ratio data.

In FIG. 13, the sensor 95 is also connected to a transmission ratio controller 9, constructed as a function generator, which issues a signal Ea having a level which changes in accordance with the degree of depression of the accelerator pedal 94, as shown in FIG. 14(c). When the accelerator pedal 95 is depressed for forward movement the function generator 9 issues a positive signal, as shown in the right half of FIG. 14(c), and when the accelerator pedal 94 is depressed for reverse movement, the function generator 9 issues a negative signal as shown in the left half of FIG. 14(c).

In this embodiment, the transmission ratio controller circuit 9 is connected directly to the lamp circuit 30.

As in the first embodiment of FIG. 1, the transmission ratio controller 9 may comprise a plurality of function generators representing different relationships between the sign of the output signal of Ea and the degree of depression of the accelerator pedal 94. The function generator matching the prevailing engine conditions is selected in the same way as described for the first embodiment of FIG. 1.

Figure 15A:
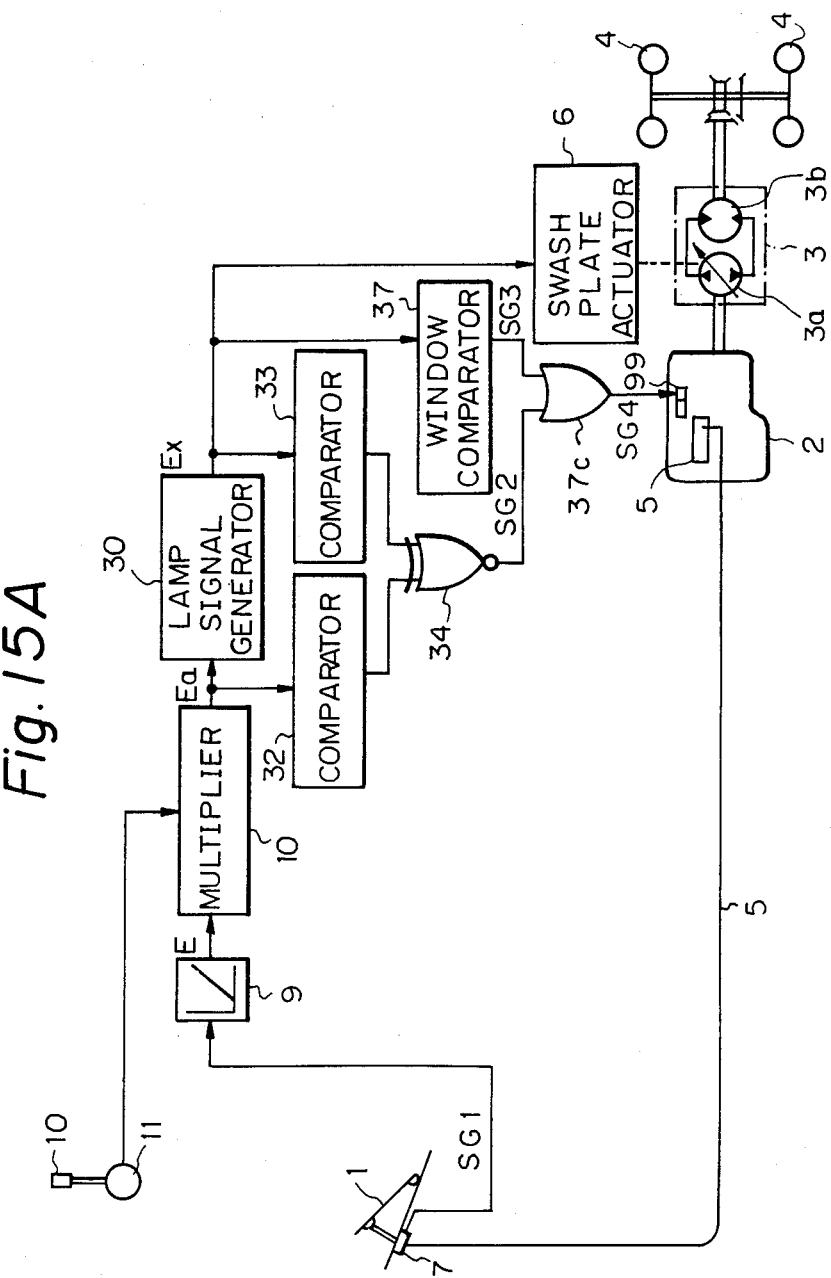
FIG. 15A shows a fifth embodiment of the present invention, wherein the supply of fuel is stopped during deceleration.

FIG. 15A shows another embodiment of the present invention which differs from the previous embodiments in that, instead of forcibly returning the throttle valve 2c to the idling position, the fuel supply is cut off when the engine is in a deceleration condition during movement of the direction control lever 11 between the forward and reverse positions.

Figure 15B:
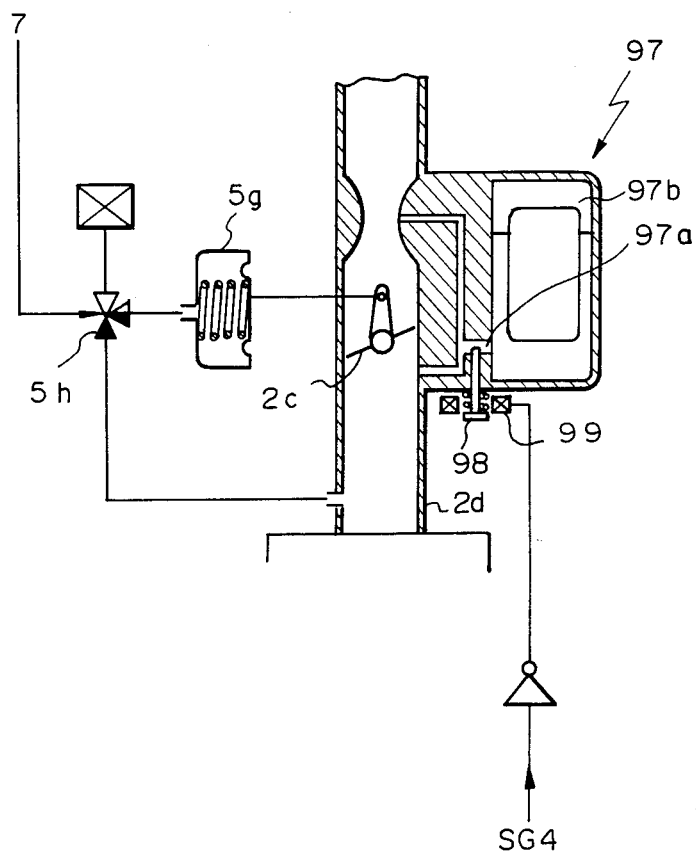
FIG. 15B is a schematic view of the fuel cut mechanism.

As shown in FIG. 15B, where the engine 2 is fitted with a carburetor 97, a shut-off valve 98 is located in a fuel passageway 97a of the carburetor 97. The fuel passageway 97a connects a float chamber 97b with an engine intake pipe 2d. An electromagnetic type actuator 99 is provided for selectively operating the shut-off valve 98. When the actuator 99 is energized, the shut-off valve 98 protrudes into the fuel passageway 97a and shuts off the intake pipe 2d from the float chamber 97b to cut off the supply of the fuel to the intake pipe 2d. When the solenoid 99 is de-energized, the shut-off valve 98 is retracted and the fuel passageway 97a is opened to allow usual engine operation. In this embodiment, a throttle actuator 5 is constructed by a diaphragm actuator 5g and an electromagnetic switching valve 5h.

Returning to FIG. 15A, a circuit for obtaining the transmission ratio signal Ea and Ex is constructed in the same way as shown in FIG. 9. Namely, a transmission ratio controller 9, a multiplier 10, comparator units 32 and 33, an EXNOR gate 34, and a window comparator unit 37 are provided. In the same way as shown in FIG. 9, the EXNOR gate 34 detects a decelerating condition during the movement of the direction control lever 11 between the forward and reverse positions. The window comparator 37 detects, during this deceleration, an area within which the vehicle speed has decreased or increased near to zero speed, to recover the supply of fuel to the engine prior to engine acceleration. The OR gate 37c issues a signal SG4 to the actuator 99 to close the fuel passageway 97a and cut off the supply of fuel.

The sensor 7 outputs a signal representing the degree of depression of the accelerator pedal 1. This signal is input to the control valve 5h. The valve 5h is operated in accordance with duty ratio of the received signal to control the vacuum level in the diaphragm actuator 5g. Thus, the degree of opening of the throttle valve 2c is controlled in accordance with the degree of depression of the accelerator pedal 1. In this embodiment, the engine speed controller 8 comprising a plurality of function generators, as in FIG. 1, can be employed.

In the operation of the embodiment in FIG. 15A, when the engine is in a steady state or acceleration condition the EXNOR gate issues a logic signal "1", and thus the fuel cut off actuator 99 is de-energized to open the fuel passageway 97a of the carburetor 97, and fuel is supplied to the engine. During deceleration caused by the movement of the lever 11 the EXNOR gate 34 issues a logic signal "0", and thus the fuel cut off actuator 99 is energized to allow the valve 98 to move and close the fuel passageway 97a, and thereby the supply of fuel to the engine is stopped and the throttle valve 2c is opened, because the degree of depression of the accelerator pedal 1 is maintained. Thus, a certain amount of engine braking effect is created because the engine speed is suitably controlled.

When the engine speed is decreased or increased near to zero, the window comparator unit 37 issues a logic signal "1". The fuel cut off actuator 99 is the de-energized to open the fuel supply passageway 97a, and thus the supply of fuel is recovered prior to engine acceleration.

In this embodiment, the supply of fuel is cut off during deceleration caused by movement of the lever 10 between the forward and reverse positions. Thus, an effective engine braking is obtained, enabling the operator to easily control the vehicle.

Figure 16:
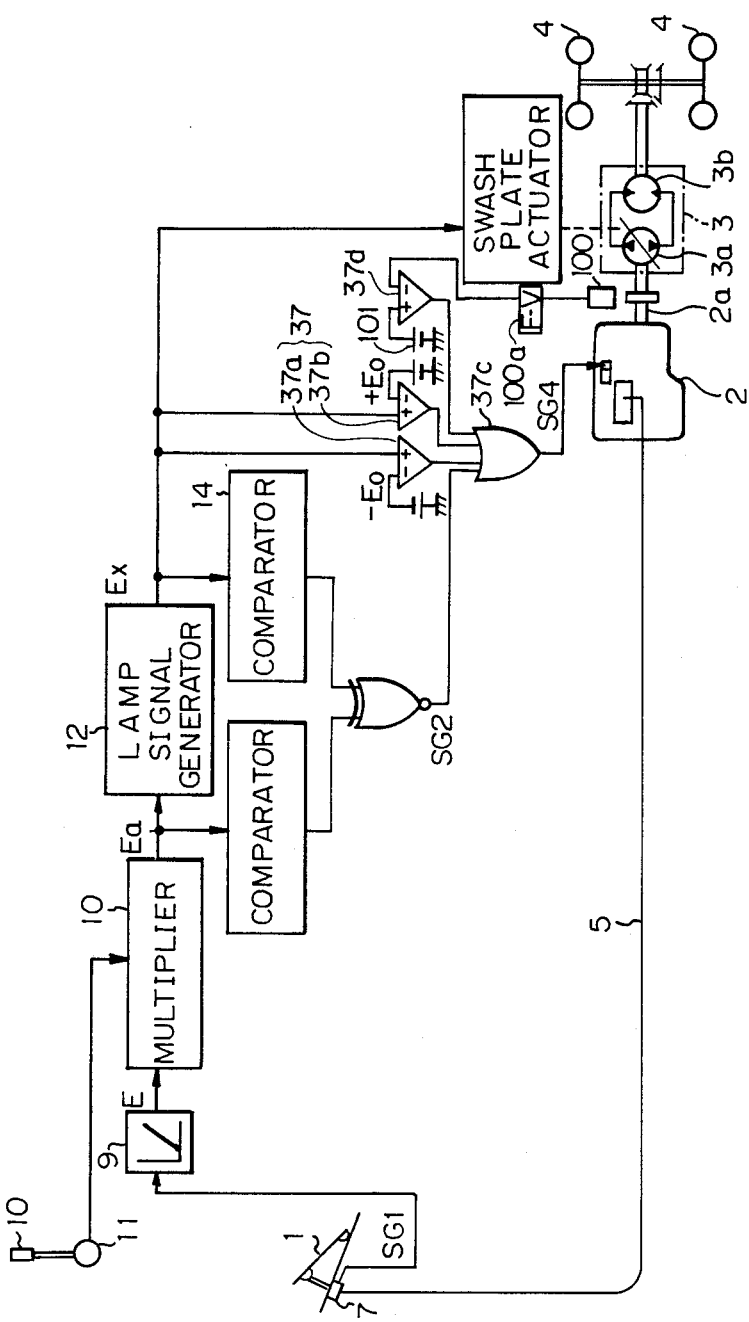
FIG. 16 shows a sixth embodiment of the present invention.

In a modification of this embodiment, as shown in FIG. 16, the window comparator unit 37 includes, in addition to the comparators 37a and 37b for detecting the value of the transmission ratio area near to zero, as described with reference to FIG. 9, a further comparator 37d. The comparator 37d has a first input connected via a F-V convertor 100a to a sensor 100 mounted adjacent to the crank shaft 2a, to produce a signal having a level which varies in accordance with the engine speed, and a second input connected to a voltage generator 101 providing a predetermined voltage level corresponding to an engine speed slightly higher than the minimum speed, at which the engine may stall. The comparator 37d has an output connected to the OR gate 37c.

The comparator 37a or 37b detects the range Ex near to zero during deceleration caused by movement of the lever 11 between the forward and reverse positions, to permit the OR gate 37c to issue a logic signal "1" to the fuel cut actuator to restart supply of the fuel prior to engine acceleration. In addition, the comparator 37d issues a logic signal "1" when the engine speed decreases to a value lower than a predetermined value above the minimum engine speed. The OR gate 37c operates to recover the supply of fuel to the engine even if the transmission ratio Ex is still decreasing to the value near to zero. Thus the engine speed can be increased before the engine speed decreases below the minimum engine speed level, to prevent the engine from stalling.

Figure 17:
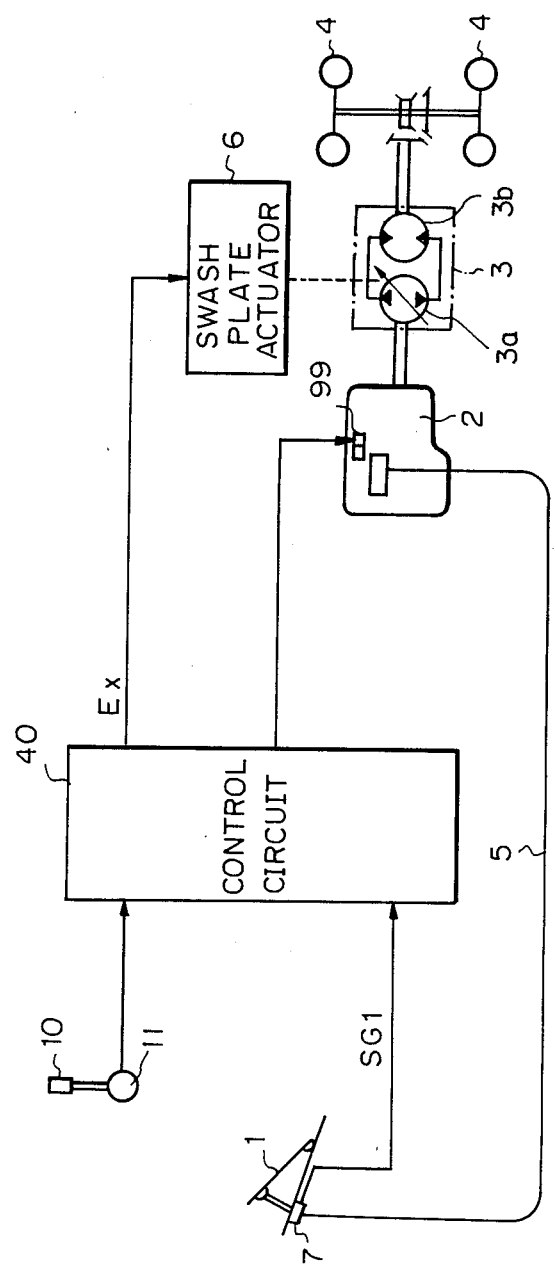
FIG. 17 shows a seventh embodiment of the present invention.

FIG. 17 is a modification of the embodiment shown in FIG. 15A, wherein the fuel is cut off during deceleration. In this modification, a computer control circuit 40 is provided for operation of the swash plate actuator 6 and the fuel cut off actuator 99 having the construction shown in FIG. 15B. In this embodiment, the throttle actuator 5 is independently operated, as explained with reference to FIG. 15A. The computer 40 has the same construction as shown in FIG. 11.

Figure 18:
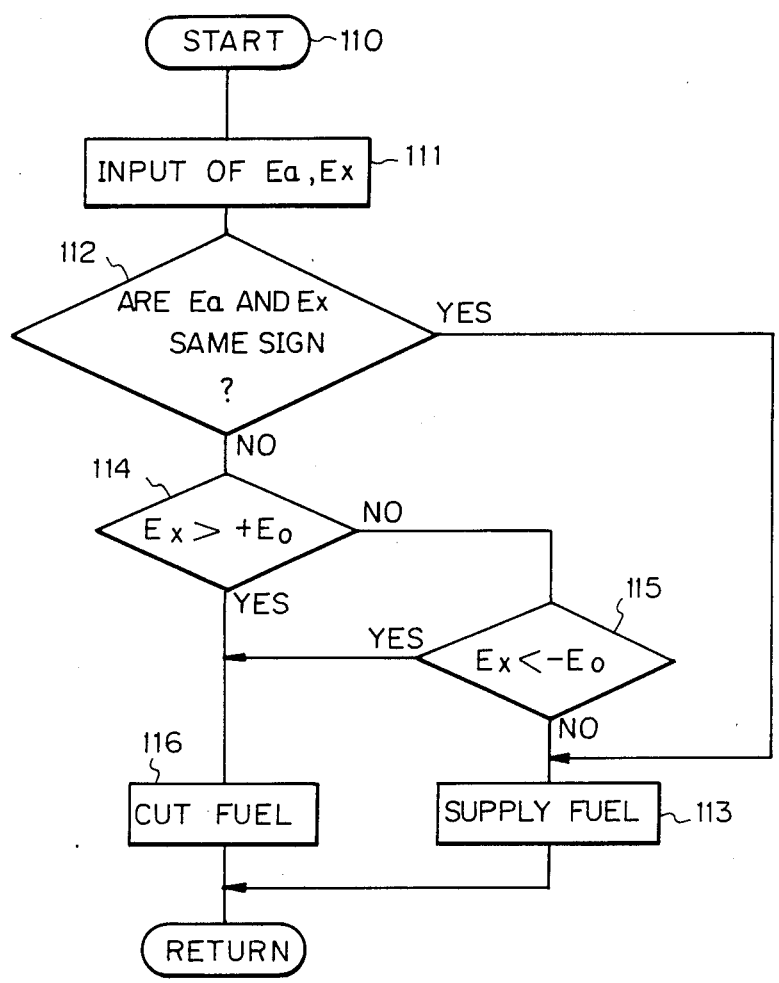
FIG. 18 is a flow chart for the operation of the embodiment shown in FIG. 17.

The routine used by the computer 40 for operating the swash plate actuator 6 is substantially the same as that shown in the flowchart of FIG. 12A. Therefore, only a routine for operating the fuel cut off actuator 99 will be described with reference to the flowchart shown in FIG. 18. This flowchart shows a time interruption routine which enters execution at prodetermined time periods, as shown at point 110. At point 111, the data of the transmission ratios Ea and Ex calculated by the routine as shown in FIG. 12A is input. At point 112, it is judged whether the transmission ratio data Ea and Ex have the same sign. During the steady state or acceleration condition, the result of the judgement at point 112 is "yes", and the routine then goes to point 113, where a signal is sent to the fuel cut off actuator 99 to allow a supply of fuel to the engine.

A judgement "no" at point 112 means that the engine is now decelerating, and thus the routine goes to point 114 where it is judged whether Ea is larger than +E0. If Ea is not larger than +E0, then at point 115 it is judged whether Ex is smaller than −E0. A judgement of "yes" at point 114 or 115 means that the vehicle is decelerating, and the routine then goes to point 116 where a signal is issued from the control circuit 40 to the fuel cut off actuator 99 to stop the supply of fuel to the engine.

A judgement of "no" at point 114 or 115 means that the engine speed has decreased to a value near to zero, and the routine then goes to point 113 to begin the supply of fuel to the engine before the engine is accelerated. Thus, the vehicle can quickly attain an acceleration condition.

In the previous embodiment, deceleration is detected by a combination of the Ea comparator and the Ex comparator. However, in the embodiment shown in FIG. 19, deceleration is detected by a first comparator 32 for detecting Ea and a second comparator 33' for detecting vehicle speed. As for the comparator 32 in FIG. 1, the first comparator 32 is connected to the multiplier 10 for receiving the transmission ratio signal Ea. The second comparator 33' has a first input connected to ground and a second input connected to a transducer 130 connected to a vehicle speed sensor 131. The vehicle speed sensor 131 may comprise a pair of electromagnetic pick-ups (not shown) arranged facing a magnetic member 3k on the output shaft 3c of the transmission 3. Pulse signals having a different phase are obtained from the electromagnetic pick-ups. These pulse signals are introduced to the transducer 130 to obtain an analogue signal having a level which changes, as shown in FIG. 20, in accordance with the rotational speed of the shaft, i.e., vehicle speed.

Figure 21:
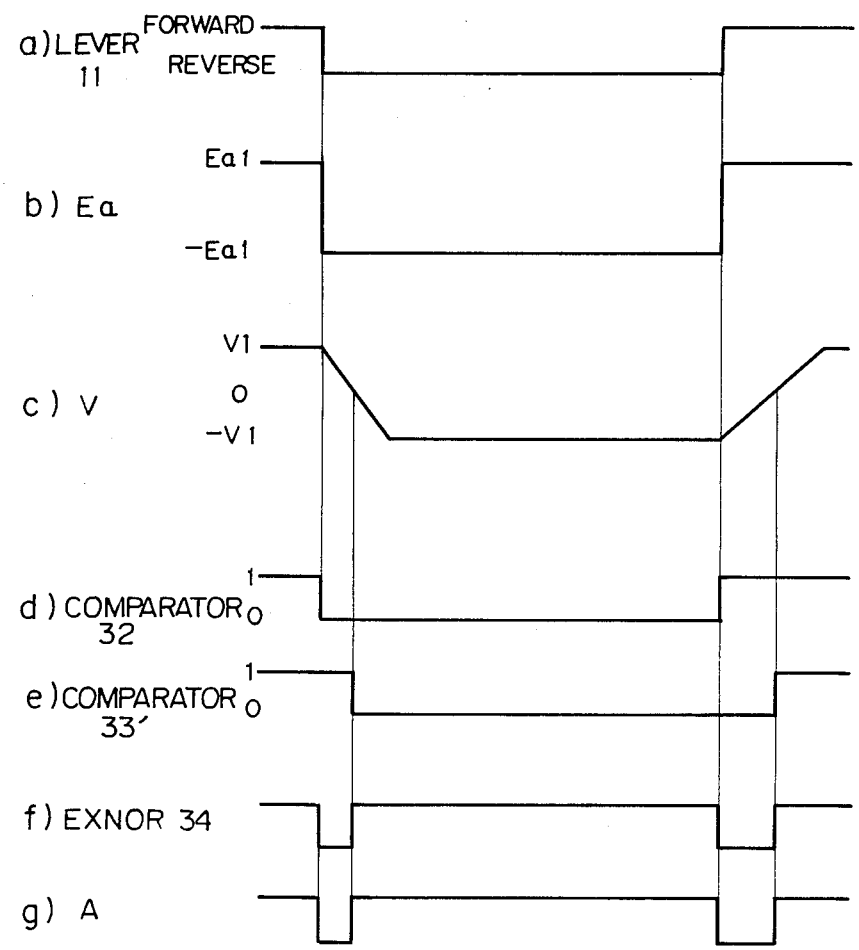
FIGS. 21a-g are timing charts for explaining the operation of the embodiment shown in FIG. 19.

When the lever 11 is moved between the forward position and reverse position, as shown in FIG. 21(a), the level of the transmission ratio signal Ea instantly changes between Ea1 and −Ea1, as shown in FIG. 21(b), while the vehicle speed V changes slowly between V1 and −V1, as shown in FIG. 21(c). The value of the first comparator 32 changes between 1 and 0, while the state of the comparator 33' changes between 1 and 0 after the value of the engine speed V has reached zero. Thus, the EXNOR gate 34 detects a deceleration condition wherein the states of the inputs are different and issues a logic signal "0", as shown in FIG. 21(f), which mulitplies the level of the signal A from the engine speed controller 8 (FIG. 19) as shown in FIG. 21(g). Thus the throttle valve 2c is forcibly returned to the fully closed position.

Figure 19:
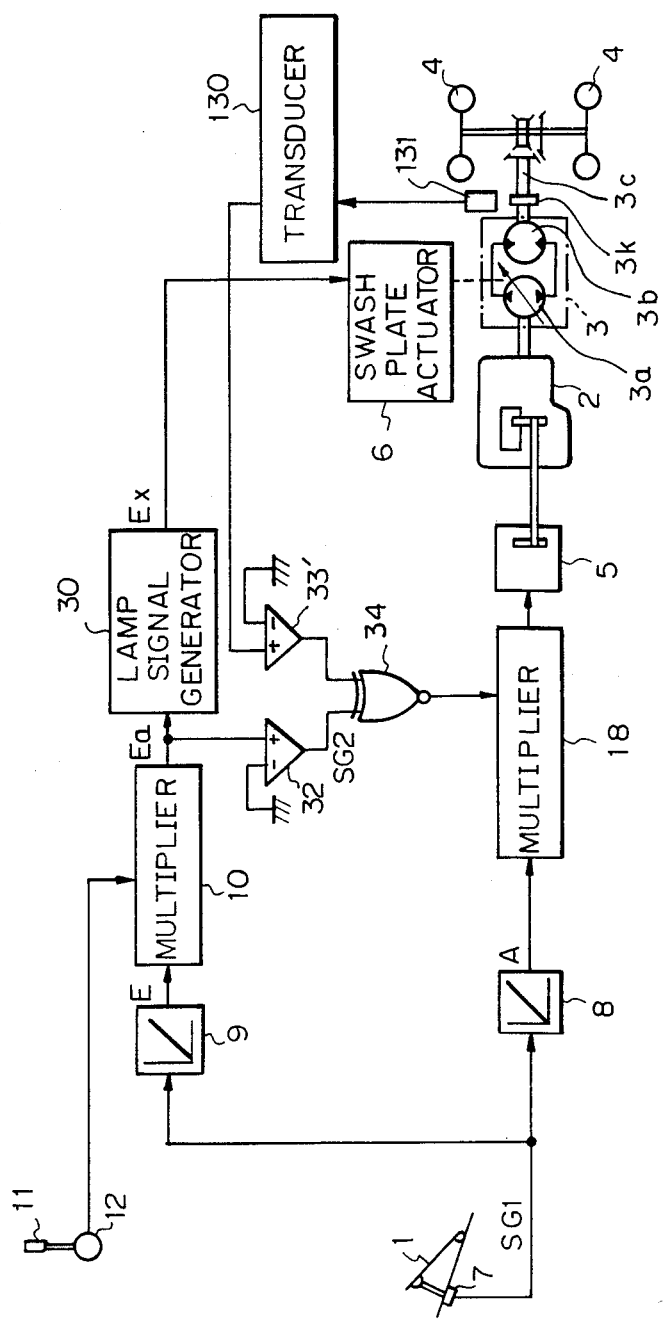
FIG. 19 shows an eighth embodiment of the present invention, wherein a vehicle speed sensor is employed for detecting deceleration.
Figure 20:
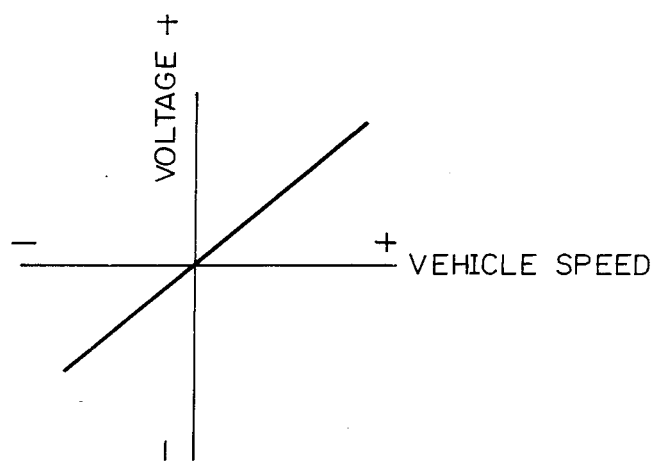
FIG. 20 shows a relationship between the vehicle speed and the output level in the vehicle speed sensor signal.
Figure 22:
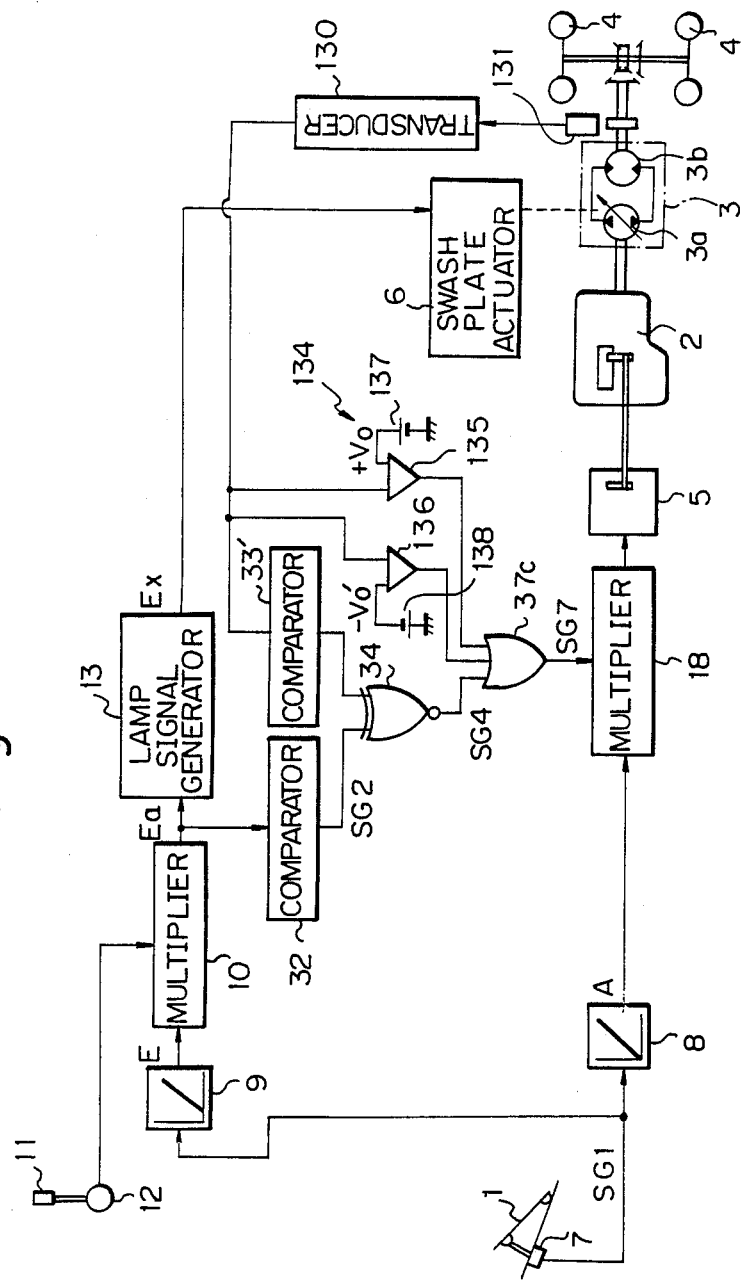
FIG. 22 shows a ninth embodiment of the present invention.
Figure 23:
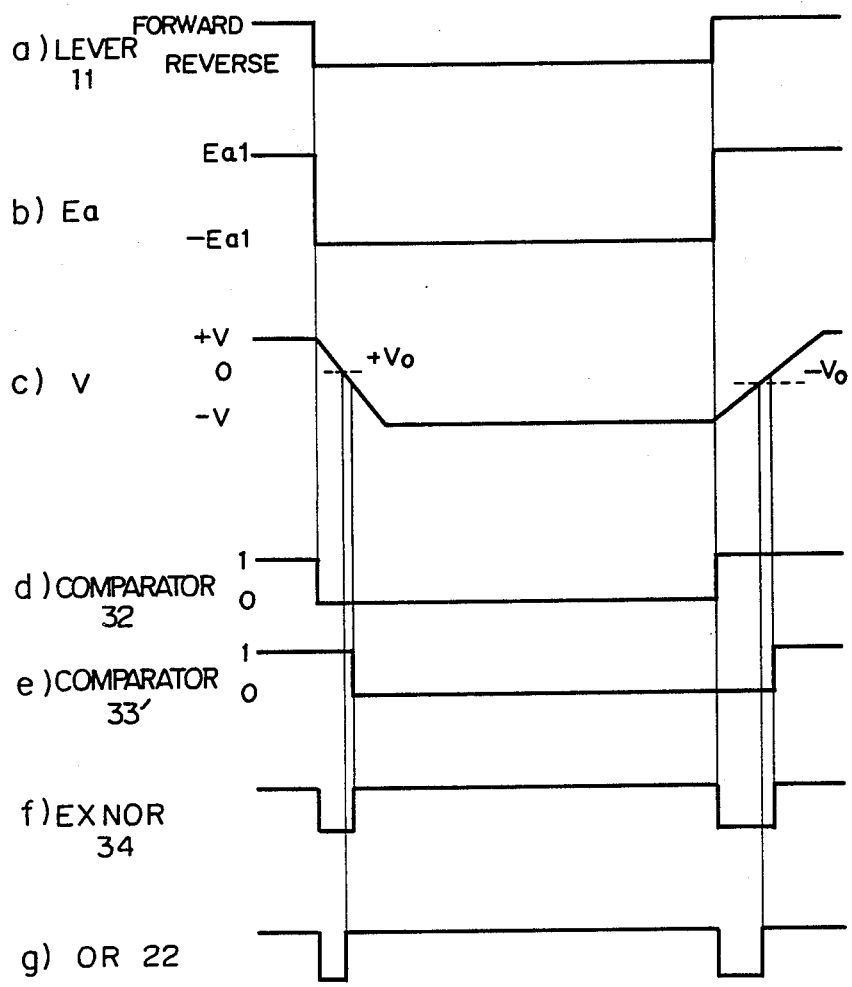
FIGS. 23a-g show timing charts for explaining the operation of the embodiment shown in FIG. 22.

FIG. 22 shows a modification of the embodiment of FIG. 19. In FIG. 22 an window unit 134 is added to the system shown in FIG. 19. The window unit 134 has the same object as the window 37 shown in FIG. 9, in that it detects a region near to the vehicle speed of zero during deceleration. However, the construction is different in that the window unit 134 detects the vehicle speed directly, instead of detecting the value of the transmission ratio Ex in the former embodiment. As shown in FIG. 22, the window unit 134 has a first comparator 135 and second comparator 136 each connected to the transducer 130 providing the signal indicating the vehicle speed V as shown in FIG. 20. The first comparator 135 has a reference input connected to a voltage generator 137 issuing a signal of a predetermined voltage +V0 near to zero, as shown in FIG. 23(c). The second comparator 136 has an input connected to a voltage generator 138 issuing a signal of a predetermined level −V0' near to zero, as shown in FIG. 23(c).

During deceleration caused by the movement of the lever 11 between the forward and reverse positions, the vehicle speed V changes as shown in FIG. 23(c). When the vehicle speed V is decreased to +V or −V' during deceleration, the state of the comparator 135 or 136 changes from "0" to "1", and the OR gate 22 issues a logic signal "1", as shown by FIG. 23(g). Accordingly, the supply of the engine speed data A is recovered before the vehicle speed has reached zero, and thus the vehicle can be quickly placed in an acceleration condition.

Figure 24:
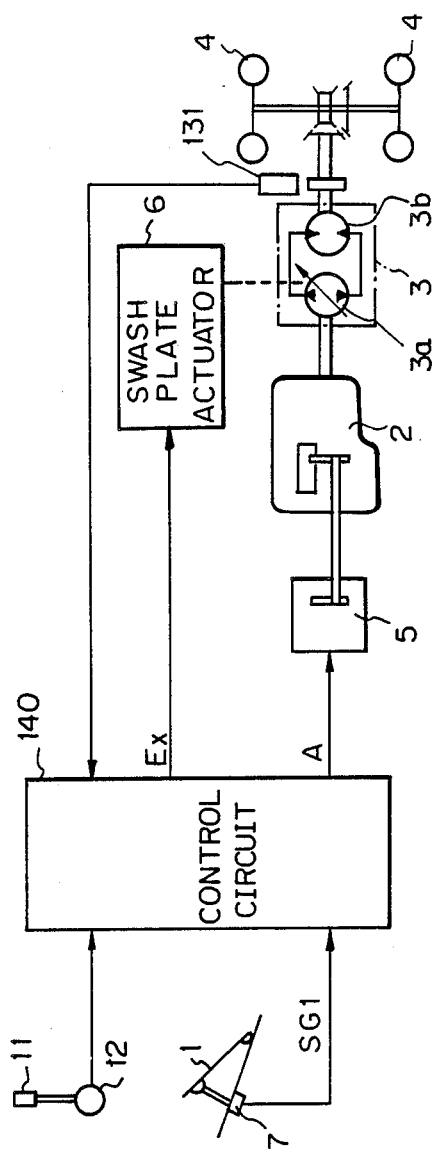
FIG. 24 shows a tenth embodiment of the present invention, in which control is carried out by a computer.

FIG. 24 shows an embodiment of the present invention wherein substantially the same operation as that of the embodiment shown in FIG. 22 is carried out by the control circuit 140. The control circuit 140 can be of a similar construction to that of the circuit shown in FIG. 22, but in this embodiment, the sensor 131 for producing pulse signals corresponding to the vehicle speed V is connected directly to the control circuit 140.

Figure 25:
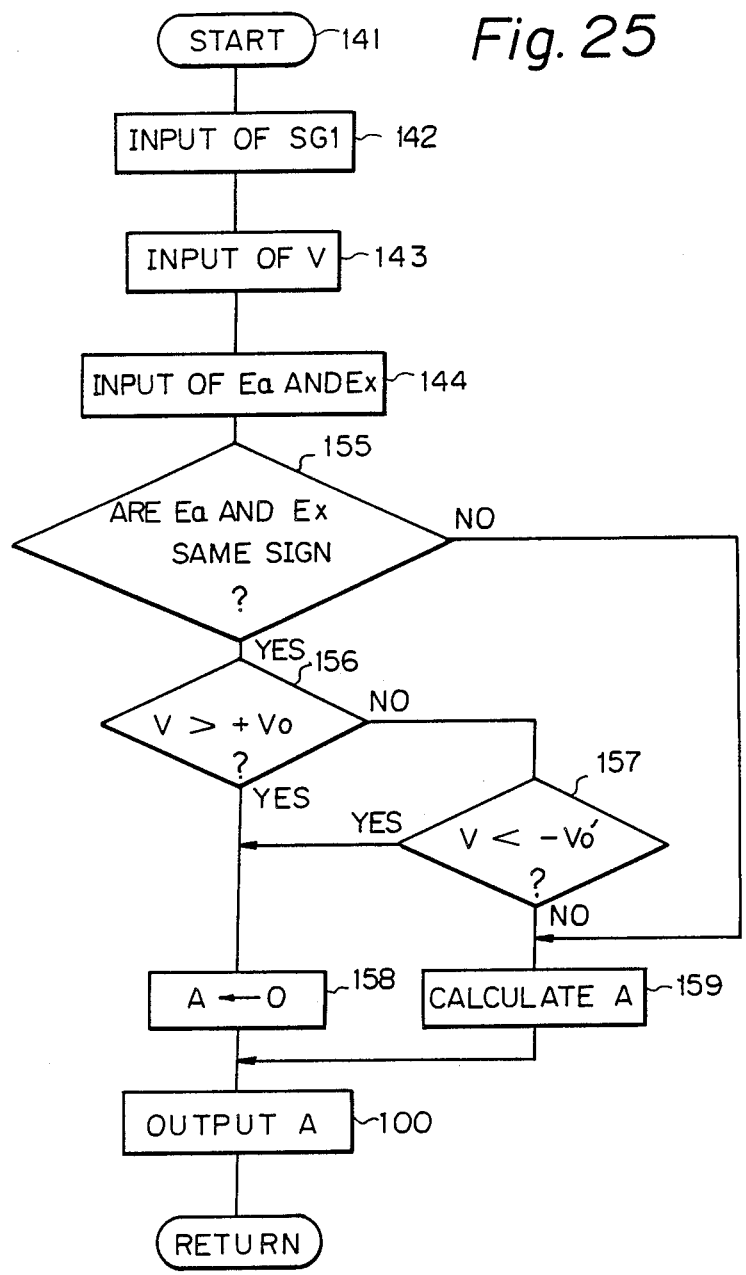
FIG. 25 shows a flowchart for explaining the operation of the embodiment shown in FIG. 24.

The routine used by the control circuit 140 for operating the swash plate is substantially the same as that shown by the flowchart in FIG. 12A. Therefore, only a routine for operating the throttle actuator 5 will be explained with reference to a flow chart shown in FIG. 25. This flowchart is similar to that shown in FIG. 12B but differs therefrom in that, at point 156, it is judged whether the vehicle speed value V is larger than a predetermined value +V0, and at point 157, it is judged whether the vehicle speed value V is smaller than a predetermined value −V0. When the engine is in a steady state or acceleration condition, the routine goes to point 159 where the value of the engine speed requirement data A is calculated in accordance with the degree of depression of the accelerator pedal 1 sensed by the sensor 7 at point 142. When the engine is in a deceleration condition ("yes" at point 155), the program proceeds to point 158 where A is fixed to zero, and thus the throttle valve 2c (FIG. 3A) is forcibly returned to the idling position even if the accelerator pedal is depressed. When the vehicle speed V detected by the speed sensor 131 at point 143 is in the range near to zero ($V = -V0' - +V0$) during deceleration, the routine goes to point 159 and a signal is issued to the throttle actuator 5 to open the throttle valve 2c prior to acceleration.

Figure 26:
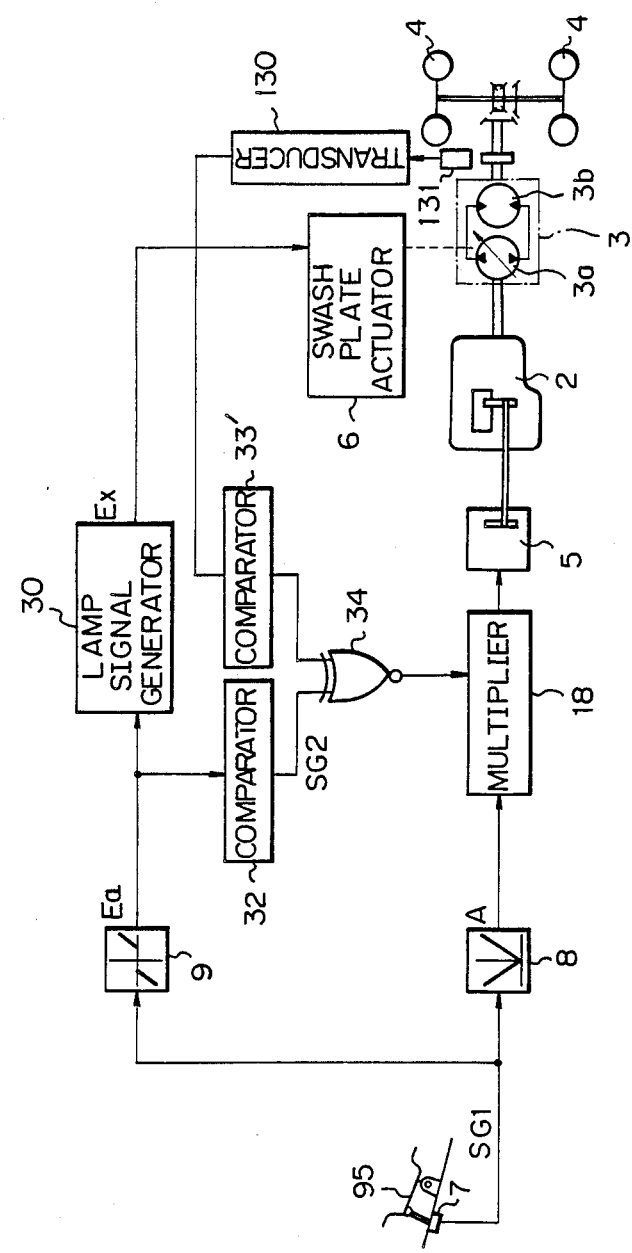
FIG. 26 shows another embodiment of the present invention.

The embodiment of the present invention shown in FIG. 26 is similar to the embodiment shown in FIG. 19, in that deceleration is detected by the comparator 33' in response to a signal from the vehicle speed transducer 130 connected to the vehicle speed pick-up 131. In this embodiment, however, a seesaw type accelerator pedal 95 similar to that described in FIG. 13 is employed. Therefore, the lever 11 and the multiplier 10 in FIG. 19 can be eliminated.

Figure 27:
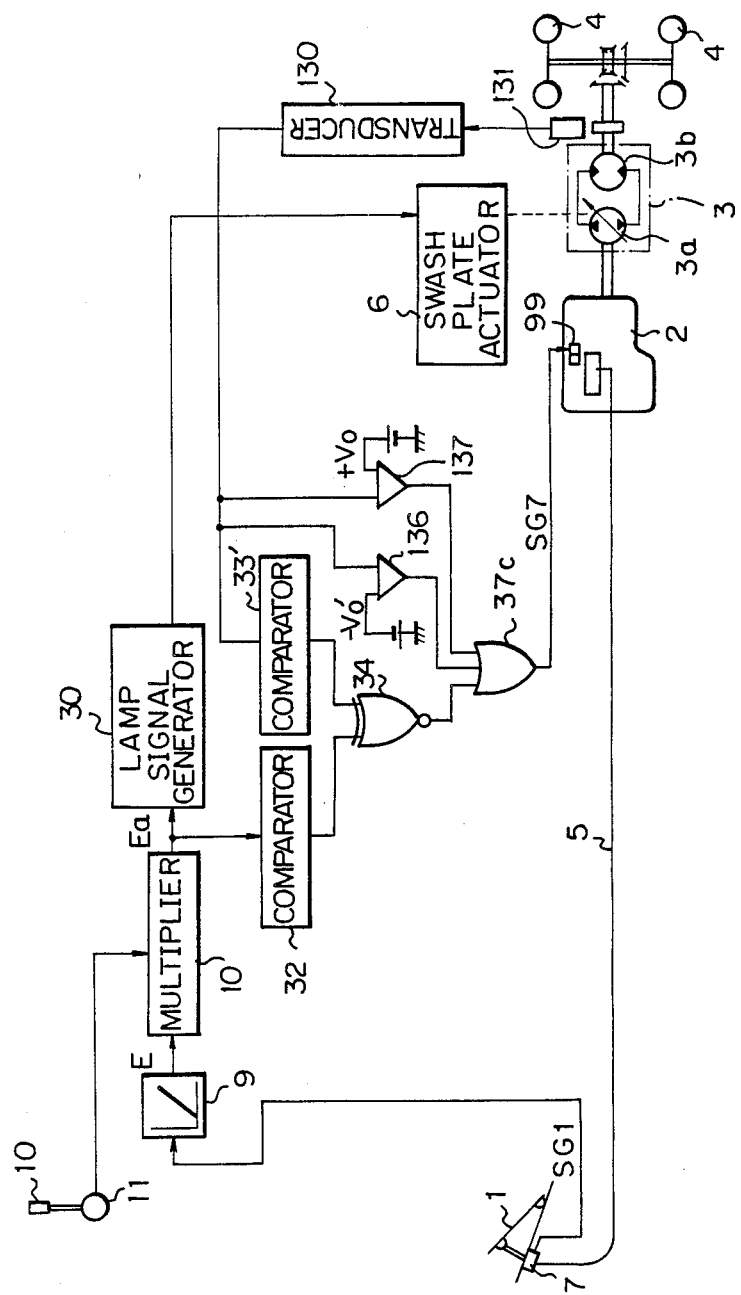
FIG. 27 shows another embodiment of the present invention.

FIG. 27 shows an embodiment of the present invention similar to the embodiment shown in FIG. 14, i.e., the embodiment of FIG. 27 is provided with a fuel cut actuator 99. The deceleration detecting comparator unit 33' is similar to that shown in FIG. 22, in that it detects the engine speed from the transducer 130 connected to the vehicle speed sensor 131, and in that the window comparator unit(135 and 136) detects the area near to zero speed by detecting the vehicle speed area ($-V0'$ to $+V0$) from the transducer 130.

Figure 28:
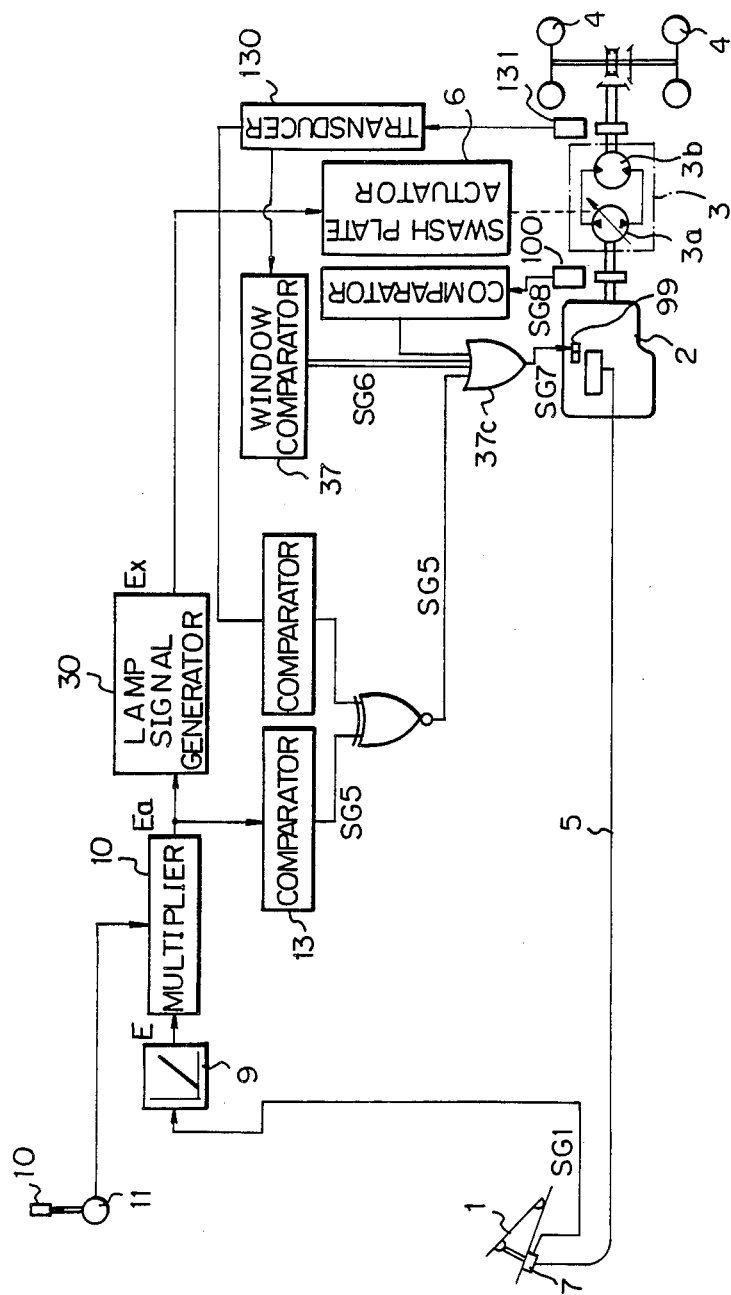
FIG. 28 shows another embodiment of the present invention.

FIG. 28 shows a modification the embodiment shown in FIG. 27. The embodiment shown in FIG. 28 differs from the embodiment shown in FIG. 27 in that a further window unit 37, similar to that shown in FIG. 16, is provided for detecting a predetermined level of the engine speed detected by the engine speed sensor 131. Thus the supply of fuel is recovered during deceleration when the engine speed has dropped below the predetermined value, and engine stalling is prevented.

Figure 29:
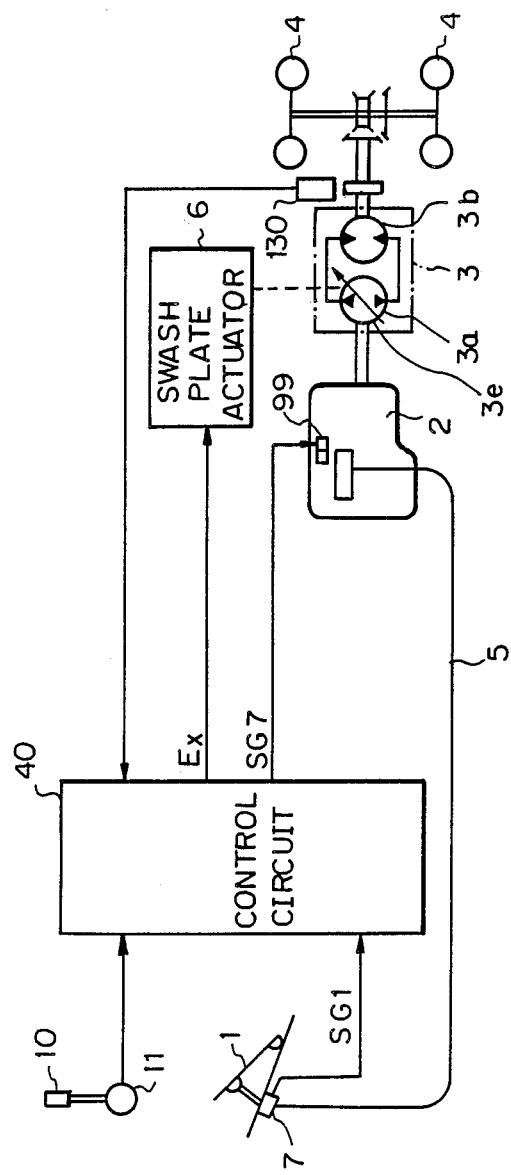
FIG. 29 shows another embodiment of the present invention.
Figure 30:
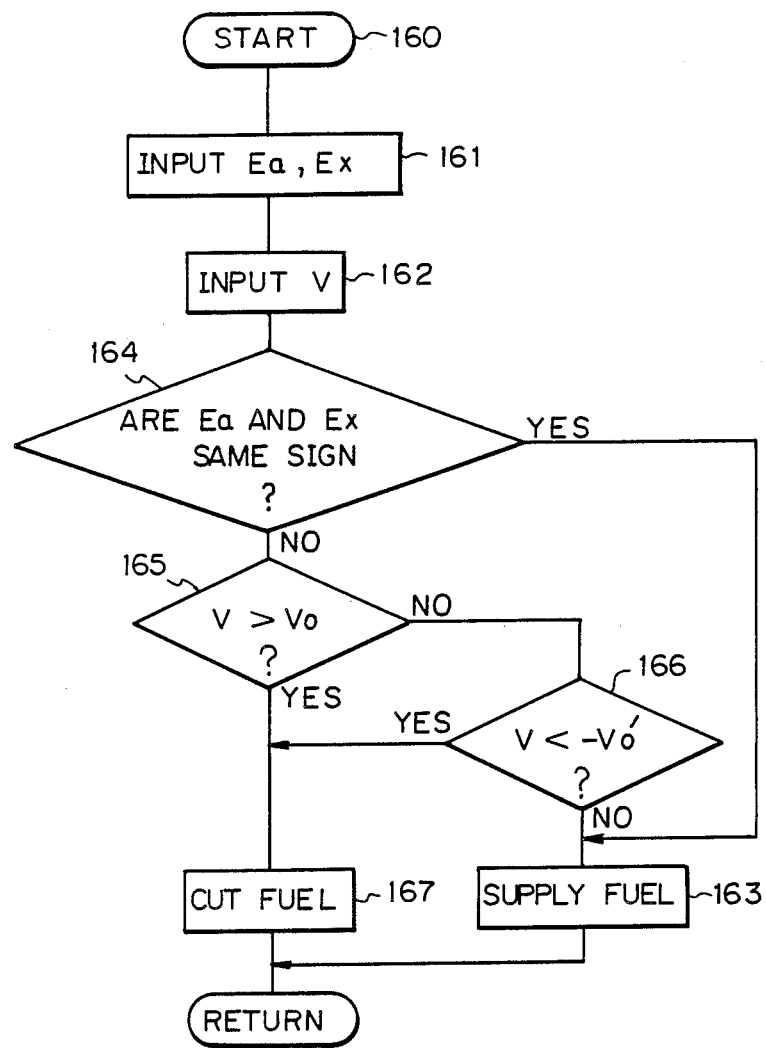
FIG. 30 shows a flowchart for explaining the operation of the embodiment shown in FIG. 29.

FIG. 29 shows a modification of the embodiment shown in FIG. 27, wherein the same operation is carried out by the computer control circuit 40. The routine for controlling the operation of the swash plate 3e is substantially the same as the routine shown in FIG. 12A. The routine for controlling the fuel cut actuator 99 is shown in FIG. 30 and is similar to the routine shown in FIG. 18: The difference being mainly that, at point 165, it is judged whether the vehicle speed V as sensed by the vehicle speed sensor 165 is larger than a predetermined value V0 near to zero, and that, at point 166, it is judged whether the vehicle speed V is smaller than a predetermined value $-V0'$. During a deceleration other than a speed area adjacent to zero, step 167 is executed to operate the fuel cut actuator 99 and cut the supply of fuel. When the vehicle speed is in the area near to zero during deceleration, the routine goes to point 163 to de-energize the fuel cut actuator 99 and recover the supply of fuel prior to acceleration.

Figure 31:
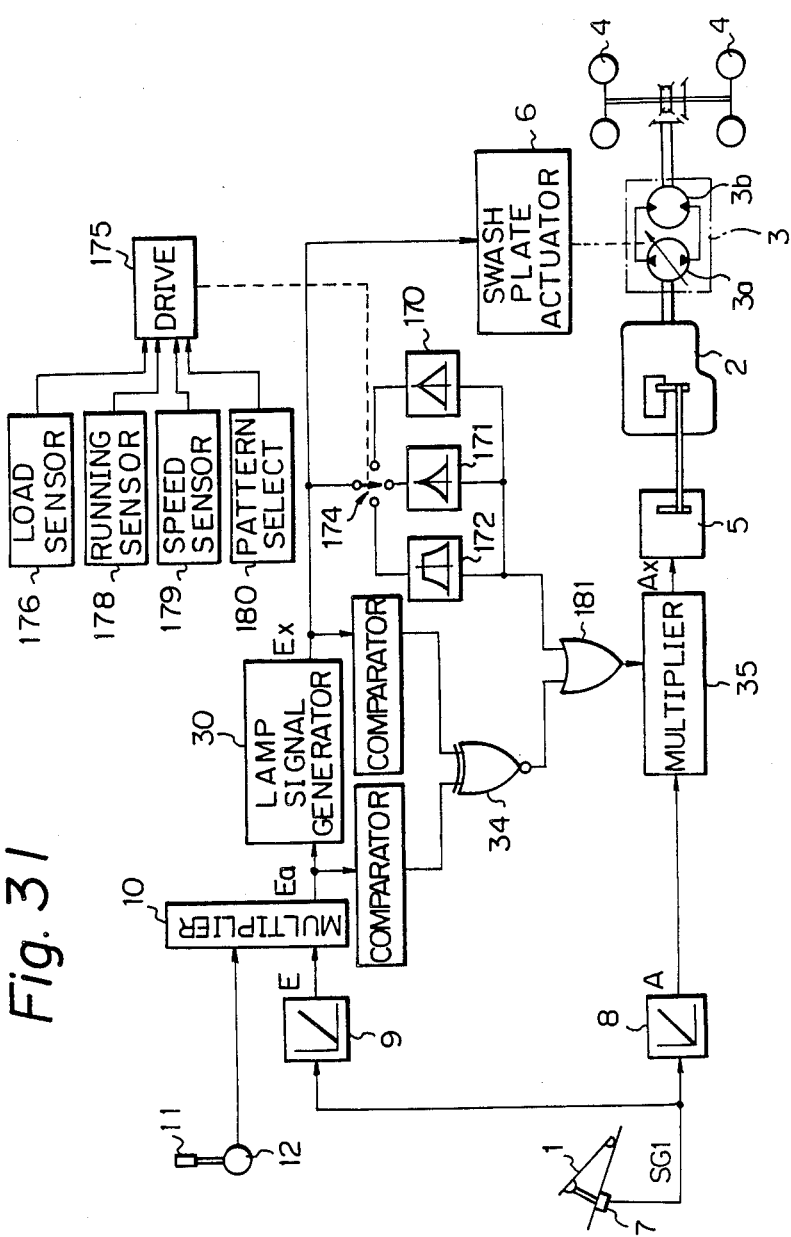
FIG. 31 shows another embodiment of the present invention wherein the correction factor during deceleration is variable.
Figure 32:
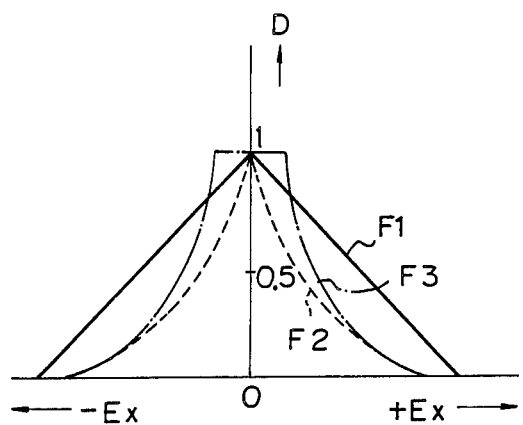
FIG. 32 shows graphs for explaining the relationship between the value of transmission ratio Ex and the value of correction factor D.

FIG. 31 shows an embodiment of the present invention which differs from the embodiment shown in FIG. 1 in that a device is provided for changing the value of the correction factor D to be multiplied by the engine speed data A from the controller 8 when the vehicle is in the deceleration condition caused by the movement of the direction control lever 11 between the forward and reverse positions. The device is provided with a plurality of transducers 170, 171, and 172 for issuing, in response to the transmission ratio signal Ex from the lamp signal generator 30, a correction factor signal D having a level which changes as shown in FIG. 32. The level is 1 when Ex is equal to 0, and the level decreases toward 0 as Ex increases or decrease from 0. The transducers 170, 171, and 172 provide three different relationships; F1, F2, and F3, respectively, in FIG. 32. In the curve F1, the value of D changes in a reverse relationship in accordance with the increase in Ex. In the curve F2, the decrease in the value of D during a medium or high engine load becomes large. In the curve F3, the value of the correction factor D is maintained at 1 at the area near to zero value of Ex. A switch 174 is provided for selecting an appropriate transducer from among the three transducers 170, 171, 172. The switch 174 is connected to a drive circuit 175 connected to a group of sensors including a carriage load sensor 176, engine load sensor 178, a vehicle speed sensor 179, and a running pattern sensor 180 operated by an operator. An OR gate 181 has a first input connected to the EXNOR gate 34 for detecting the deceleration conditions, as already explained, and an input connected to the transducers 170, 171, and 172. The Or gate 181 has an output connected to the multiplier 35 for issuing the engine speed requirement signal A produced by the correction factor D obtained by the transducer selected from among the transducers 170, 171, 172.

During the steady state or acceleration condition, the EXNOR gate 34 issues a logic signal "1", as shown in FIG. 6(g), and the OR gate 181 issues a logic signal "1" directed to the multiplier 35, so that uncorrected engine speed data A from the controller 8 is transmitted to the throttle actuator 5. Thus, the degree of opening of the throttle valve 2c is controlled in accordance with the degree of depression of the accelerator pedal 1.

During the deceleration condition, the EXNOR gate issues a logic signal "0". However, one of the transducers 170, 171 or 172 selected in accordance with the operating condition sensed by the group of sensors 176, 178, 179, and 180 issues a correction factor signal D which is introduced, via the OR gate 181, to the multiplier 35. Thus, a signal Ax which is a product of A and D is obtained, and is introduced to the throttle actuator 5 for controlling the opening of the throttle valve 2c. As shown in FIG. 32, as Ex (engine load) increases, the value of the correction factor D decreases accordingly. Namely, when the movement of the directional control lever 11 occurs during the high load condition, the value of D becomes small, i.e., the degree of opening of the throttle valve 2c becomes small. Accordingly, a higher engine braking effect during the deceleration can be obtained as the engine load becomes larger. Therefore, in the present invention, control of the deceleration can be better realized.

Figure 33:
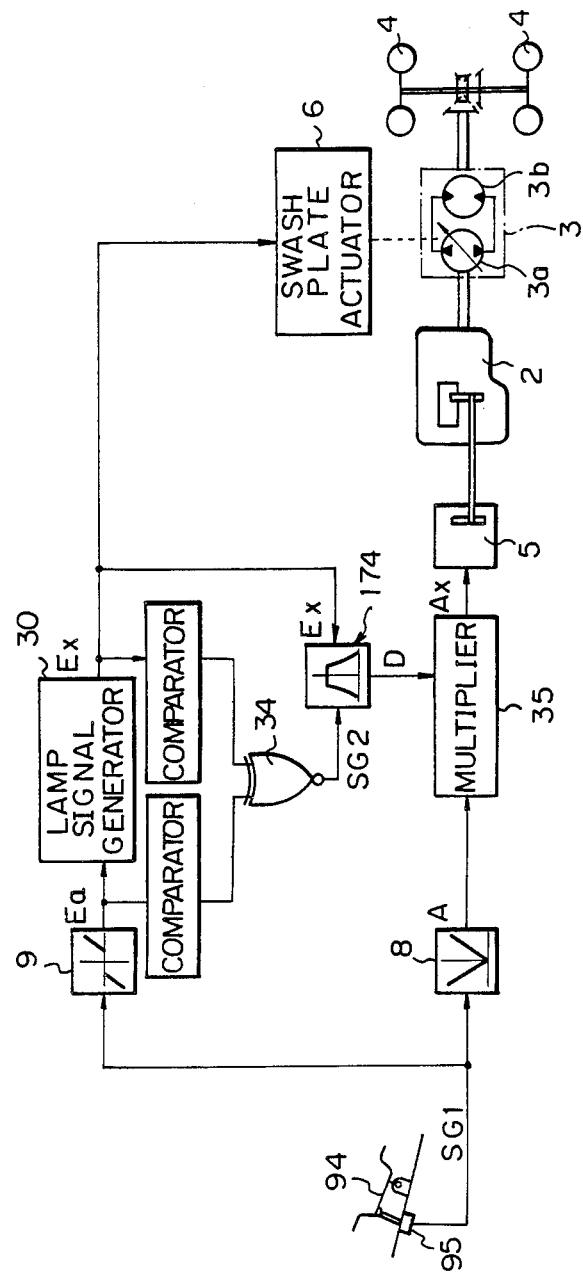
FIG. 33 shows yet another embodiment of the present invention.

FIG. 33 is a modification of the embodiment shown in FIG. 31, wherein the accelerator pedal 1 is replaced by the seesaw type accelerator pedal 94 as shown in FIG. 13.

Figure 34A:
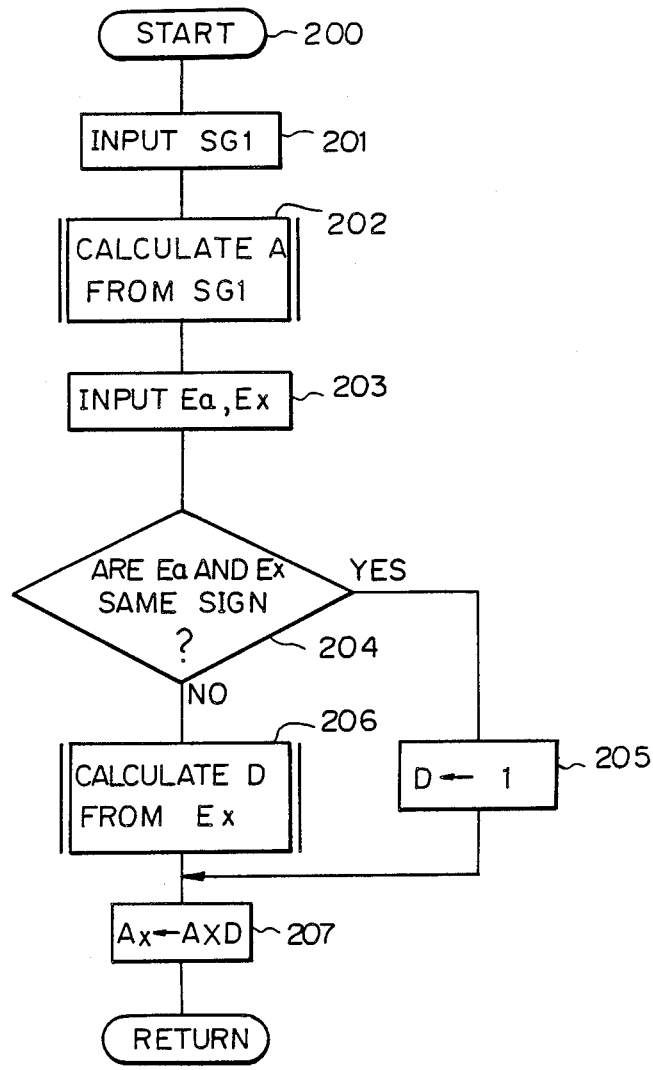
FIG. 34A shows a flowchart for explaining the operation of the embodiment shown in FIG. 33.

In another concept of the embodiment shown in FIG. 31, the value of the correction factor can be realized by the computer control system 40. In this case, the construction of the control circuit 140 is the same as shown in FIG. 11. The flowchart for operating the swash plate 3e is substantially the same as the flowchart shown in FIG. 12A. FIG. 34 shows a flowchart for operating the throttle actuator 5. In FIG. 34A, at point 201, a signal SG1 indicating the degree of depression of the accelerator pedal 1 is read. At point 202, the engine speed requirement data A is calculated from the SG1 as described with reference to FIG. 12B at step 86. When the engine is in a steady state or acceleration condition (yes at point 204) the routine goes to point 205 where the value of the correction factor D is set to 1. When the engine is in a deceleration state, the routine goes to point 206 where the value of the correction factor D is calculated from Ex. The computer is provided with a plurality of maps corresponding to the relationships F1, F2, and F3, respectively, in FIG. 32 which are stored in the memory. A map is selected in accordance with the conditions sensed by the group of sensors 176, 178, 179 and 180, and the value of the correction factor D is calculated from Ex by the selected relationship F1, F2, or F3. FIG. 34B shows a detail of the routine 206. At point 206-1, the position of the switch 174 is input. In accordance with the switch position, the routine goes to points 206-2, 206-3, and 206-4, respectively, to select maps F1, F2, and F3, respectively, to calculate D. The calculated data of D is stored in the memory area at point 206-5. The routine then goes to point 207 where the product of A and D is stored in the memory area for storing Ax. This Ax value is introduced to the throttle actuator 5, and thus the degree of throttle opening is controlled in accordance with Ax.

Figure 36:
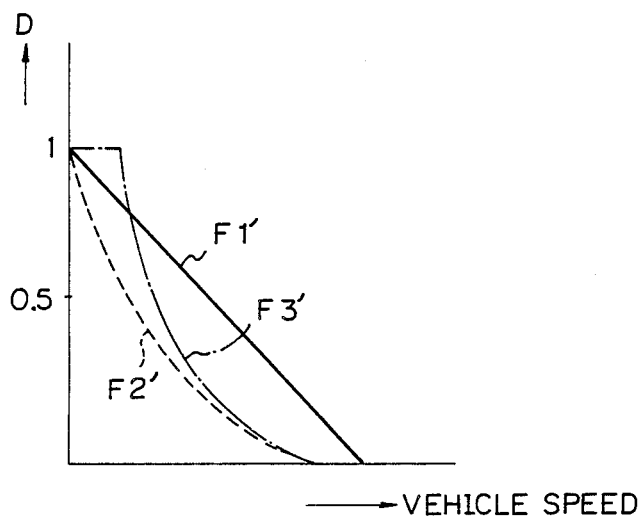
FIG. 36 is a graph showing the relationships between Ex and D in the embodiment shown in FIG. 35.
Figure 35:
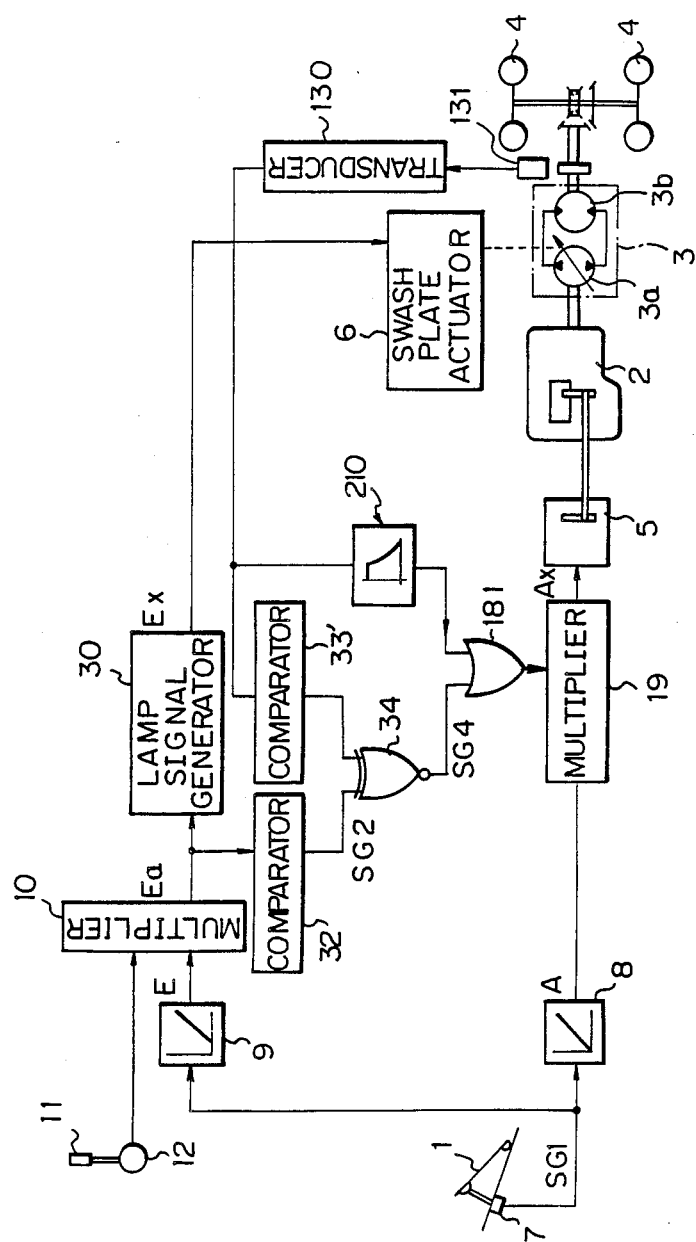
FIG. 35 shows a still further embodiment of the present invention.

FIG. 35 shows an application of the concept of FIG. 31 to the embodiment in FIG. 19, wherein deceleration is detected by the vehicle speed detected by the vehicle speed sensing device 130. In this case, the transducer 210 is constructed so that, in response to input of the absolute value of the vehicle speed, it outputs a signal corresponding to the correction factor. The device 210 may be provided with a plurality of transducers corresponding to the relationships F1', F2' and F3', respectively, in FIG. 36.

Each relationship F1', F2', or F3' corresponds to a relationship between the value of vehicle speed V and the value of the correction factor D. One transducer is, in a similar way, selected to calculate the value of D from the vehicle speed sensed by that transducer.

Figure 37:
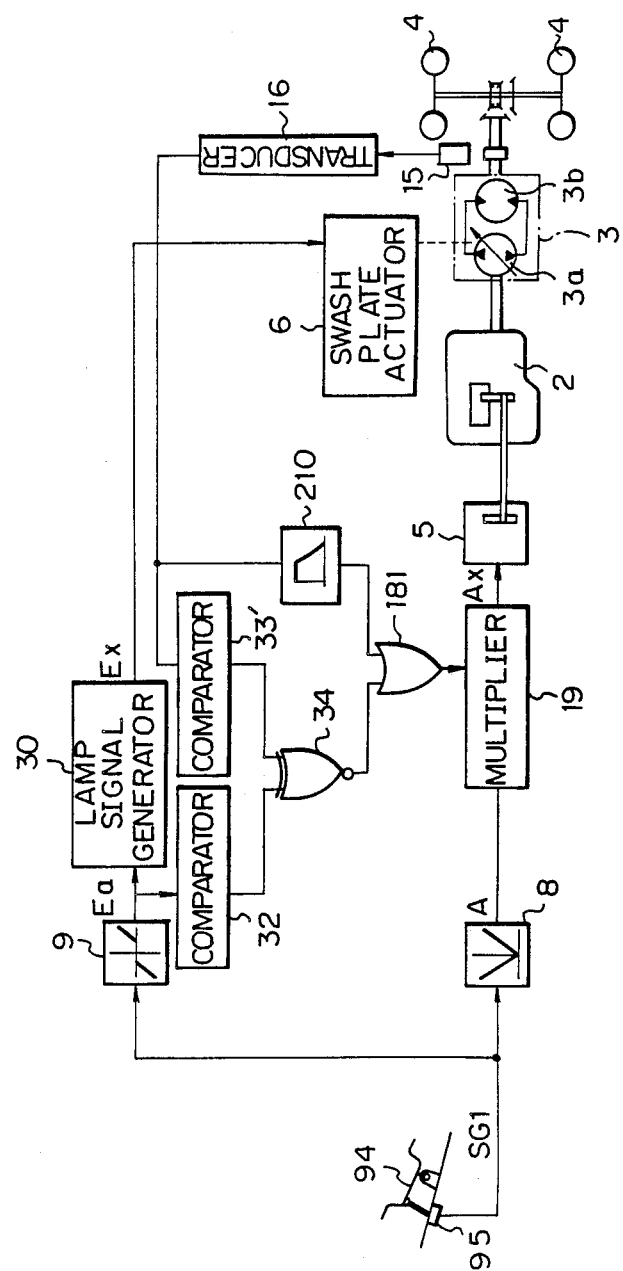
FIG. 37 shows another embodiment of the present invention.

FIG. 37 shows a modification the embodiment shown in FIG. 35, wherein the accelerator pedal 1 is replaced by a seesaw type accelerator pedal 94.

The concept of the embodiment in FIG. 31 also can be realized by the computer control system 40. In this case, the routines become substantially the same as the routines for the embodiment shown in FIG. 34.

In above description of the embodiments of the present invention, the engine is a gasoline engine. However other types of engine, such as a diesel engine can be employed. In this case, the position of a rack of a fuel injection pump would be controlled to stop fuel injection when deceleration is detected.

In the embodiment a step-less transmission device provided with a swash plate is employed. However, another type of step-less transmission such as that provided with a V-belt can be employed.

The description of the specification is directed to the application of the present invention in a fork-lift. However, the present invention can be applied to other types of vehicle, such as a loader, a truck, a passenger car, and other like vehicles.

Many modifications and changes can be made by those skilled in this art without departing from the scope and spirit of the invention.

We claim:
1. A system for controlling engine speed when the direction of movement of a vehicle is changed, comprising:
   an internal combustion engine;
   step-less transmission means for connecting the engine with the vehicle and for continuously controlling a transmission ratio from a value lower than zero to a value higher than zero for providing a desired speed of the vehicle in a desired direction of movement of the vehicle;
   actuator means for providing a transmission ratio control signal directed to said step-less transmission means, the value of the transmission ratio control signal being controlled to attain said continuous control of the transmission ratio in accordance with an engine load as required, the polarity of the transmission control signal controlling the direction of movement of the vehicle as required;
   transmission ratio control means for controlling, when the direction is to be changed between forward and reverse directions, a transient state of a value of the transmission ratio control signal from a value of the transmission control signal at a preceding steady state to a value of the transmission ratio control signal at a following steady state;
   judging means for judging a change of driving direction and deceleration condition of the vehicle to issue an engine speed control signal and
   engine revolution reducing means for adjusting an engine revolution speed to a lower engine revolution speed by said engine speed control signal from said judging means.

2. A system according to claim 1, wherein said judging means comprise control means for controlling way of change of the transmission ratio data value being changed, when the transmission ratio data issued from the running operation system is changed from a value for a forward movement to a value for reverse movement or a value for reverse movement to a value for a forward movement, the judging means judging whether the transmission ratio data is a data for deceleration upon the switching between the forward and reverse based on the operation of the forward and reverse manipulation apparatus and the value of the transmission ratio data issued by way of said control means.

3. A system according to claim 1, wherein said judging means comprise means for detecting whether the vehicle moves forwardly or the vehicle moves rearwardly, the judging means judge whether the vehicle is under the deceleration caused by the switching between forward and reverse movement based on the operation of the running operation system and the result of detection by said detecting means.

4. A system according to claim 1, wherein said engine revolution reducing means bring the engine, the rotation of which is controlled based on the operation amount of the running operation system into an idling condition when the judging means detect the deceleration condition upon the switching between the forward and the reverse movement.

5. A system according to claim 1, wherein said engine revolution reducing means comprise fuel cut means to prevent the supply of the fuel to the engine, the rotation of which is controlled based on the operation amount of the running operation system, when the judging means judge the deceleration condition upon the switching between the forward and the reverse movement.

6. A system according to claim 1, wherein said engine revolution reducing means comprise means for, when said judging means judge the deceleration condition generated by the switching between the forward and reverse movement, controlling variably the rotational speed of the engine, the rotational speed of which is controlled based on the operational parameter of the running operation system.

7. A system according to claim 1, further comprising means for detecting the direction of the operation of the running operation system.

8. A system according to claim 1, further comprising means for detecting whether the vehicle moves forwardly or rearwardly.

9. A system according to claim 1, further comprising means for detecting the speed of the vehicle.

10. A system for driving a vehicle, comprising:
an internal combustion engine;
step-less transmission means for connecting the engine with the vehicle;
first actuator means for controlling an engine operating parameter related to the engine speed;
second actuator means for controlling said step-less transmission means in such a manner that the transmission ratio is continuously changed between a value lower than zero and a value higher than zero;
manipulator means for producing a requirement of vehicle speed in a desired direction of movement of the vehicle;
first control means, responsive to movement of the manipulator means, for producing a first signal indicating the engine speed requirement, said first signal being introduced to said first actuator means;
second control means, responsive to movement of the manipulator means, for producing a second signal indicating the transmission ratio requirement, said second signal being introduced to said second actuator means;
first detecting means for detecting a switching operation of the manipulator means for changing the direction of movement of the vehicle;
lamp means for controlling a level of said second signal upon the detection of said switching operation by said first detecting means so that the level is gradually changed in accordance with a lapse of time from commencement of the switching operation;
second detecting means for detecting a change of the second signal caused by deceleration; and
engine idling control means for, when deceleration is detected, controlling the engine so that engine braking is attained.

11. A system according to claim 10, wherein said lamp means comprise a plurality of lamp circuits having different changes of level of output signal relationships with respect to lapsed time, and means for selecting one of said plurality of transducers in accordance with prevailing conditions.

12. A system according to claim 10, wherein said first control means comprise a plurality of transducer circuits each corresponding to a particular relationship between the degree of depression of the manipulator means and the level of the first signal, and selecting means for selecting one of the said plurality of transducer circuits in accordance with the engine operating conditions.

13. A system according to claim 10, wherein said step-less transmission apparatus comprises a paired hydraulic motor and pump, and a hydraulic motor connected to a vehicle, a hydraulic pump connected to the engine and an swash plate arranged between the motor and pump for controlling the amount of fluid to be transmitted therebetween, and wherein said second operation means comprise an actuator for controlling the angle of the swash plate.

14. A system according to claim 10, wherein said idling controlling means comprise fuel cut means for preventing fuel from being supplied to the engine during a deceleration condition.

15. A system according to claim 10, wherein said second detecting means comprise a first comparator for comparing the level of said second signal with a predetermined level, a second comparator for comparing the signal from the lamp means to a predetermined level, and detecting means for detecting a predetermined relationship between signs of signals from the comparators to issue a signal directed to the idling speed control means to obtain an engine idling speed.

16. A system according to claim 10, wherein said second detecting means comprise a first comparator for comparing a level of the lamp signal with a predetermined level, a second comparator for comparing engine speed data with a predetermined level, and detecting means for detecting a predetermined relationship between signs of the signals from the first and second comparators to issue a signal directed to the idling speed control means to obtain an engine idling speed.

17. A system according to claim 10, wherein said manipulator means comprise an accelerator pedal capable of being depressed in only one direction and a lever for controlling the direction of movement of the vehicle.

18. A system according to claim 17, wherein said second control means comprise transducer means for producing a signal having a predetermined sign indicative of an amount of opening of the throttle valve, and multiplier means for changing the sign of the signal produced when the position of said lever is changed.

19. A system according to claim 18, wherein said transducer means comprise a plurality of function generators having different characteristics, and means for selecting one of said plurality of function generators having a characteristic matching prevailing operating conditions.

20. A system according to claim 10, wherein said manipulator means comprise a seesaw type accelerator pedal capable of being depressed in two directions, one direction corresponding to forward movement, the other to reverse movement of a vehicle.

21. A system according to claim 20, wherein said second control means comprise transducer means for producing a signal indicating a degree of depression of a seesaw type acceleration pedal in a range between a value lower than zero and a value higher than zero.

22. A system according to claim 21, wherein said transducer means comprise a plurality of function generators having different characteristics, and selecting means for selecting one of said plurality of function generators having a characteristic matching prevailing operating conditions.

23. A system according to claim 10, wherein said internal combustion engine comprises a throttle means for controlling the amount of air fuel mixture for combustion, and wherein said first actuator means comprise throttle valve means for controlling the position of the throttle valve in accordance with a level of the first signal.

24. A system according to claim 23, wherein said idling controlling means comprise correcting means for correcting the level of the first signal in such a manner that the throttle controlling means control the opening of the throttle valve to the engine idling position during the deceleration condition.

25. A system according to claim 24, wherein said second detecting means issue a logic signal "1" during deceleration, and a logic signal "0" during a state other than deceleration, and wherein said correcting means comprise a multiplier for obtaining a signal which is the first signal multiplied by the logic signal from the second detecting means.

26. A system according to claim 10, further comprising third detecting means for detecting the area near to the end of the deceleration operation for preventing the correction of the level of the second signal, whereby engine speed is increased prior to the commencement of acceleration.

27. A system according to claim 26, wherein said third detecting means comprise means for detecting the rotational speed of the engine, comparator means for comparing the level of the rotational speed sensor with a predetermined level near to zero, and gate means having inputs connected to the second detecting means and the third detecting means and an output connected to the idling control means whereby operation of the idling control means is prevented during a low engine speed condition.

28. A system according to claim 26, wherein said third detecting means comprise means for detecting the speed of the vehicle, comparator means for comparing the level of the detecting means with at least one predetermined level, and gate means having inputs connected to the gate means and the correcting means and an output connected to the correcting means, whereby operation of the idling control means is cancelled during a low vehicle speed condition.

29. A system according to claim 26, wherein said third detecting means comprise a comparator for comparing the level of the lamp signal from the lamp means with a predetermined level, and an OR gate having inputs connected to the second detecting means and the third detecting means and an output connected to the idling control means for providing a signal for cancelling operation of said idling control means when the level of the lamp signal is in said range.

30. A system, according to claim 10, further comprising means for controlling a degree of correction of an engine speed in accordance with engine parameters related to an engine load.

31. A system according to claim 30, wherein said transducer means comprise a plurality of transducers having a different relationship between an input level of said second signal from said second control means and an output level of said lamp signal, and means for selecting one of said plurality of transducers in accordance with engine operating conditions.

32. A system according to claim 30, wherein said correction degree control means comprise transducer means for producing correction factor data in accordance with engine parameters related to an engine load, and multiplier means for obtaining a signal which is the second signal multiplied by the correction factor from the transducer means.

33. A system according to claim 32, wherein said transducer means comprise a plurality of functions generators having different characteristics, and means for selecting one of said plurality of function generators matching prevailing operating conditions.

34. A system according to claim 33, wherein said engine parameter is a lamp signal from said lamp means.

35. A system according to claim 33, wherein said engine parameter is a speed of the vehicle.

* * * * *

UNITED STATES PATENT AND TRADEMARK OFFICE
CERTIFICATE OF CORRECTION

PATENT NO. : 4,769,774
DATED : September 6, 1988
INVENTOR(S) : Narita et al.

It is certified that error appears in the above-identified patent and that said Letters Patent is hereby corrected as shown below:

Title Page: Change the assignee from "Kabushiki Kaisha Toyoda Jidoshokki; Kabushiki Kaisha Toyota Chuo Kenkyusho Seisakusho" to --Kabushiki Kaisha Toyoda Jidoshokki Seisakusho and Kabushiki Kaisha Toyota Chuo Kenkyusho--

Signed and Sealed this

First Day of August, 1989

*Attest:*

DONALD J. QUIGG

*Attesting Officer*     *Commissioner of Patents and Trademarks*